(12) United States Patent
Hirata

(10) Patent No.: US 10,241,427 B2
(45) Date of Patent: Mar. 26, 2019

(54) POLYCARBONATE COPOLYMER, COATING SOLUTION, ELECTROPHOTOGRAPHIC PHOTORECEPTOR, AND ELECTRIC DEVICE

(71) Applicant: IDEMITSU KOSAN CO., LTD., Tokyo (JP)

(72) Inventor: Kengo Hirata, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/311,320

(22) PCT Filed: May 15, 2015

(86) PCT No.: PCT/JP2015/064112
§ 371 (c)(1),
(2) Date: Nov. 15, 2016

(87) PCT Pub. No.: WO2015/174533
PCT Pub. Date: Nov. 19, 2015

(65) Prior Publication Data
US 2017/0075237 A1    Mar. 16, 2017

(30) Foreign Application Priority Data

May 16, 2014  (JP) ................... 2014-102873

(51) Int. Cl.
G03G 5/05      (2006.01)
C08G 64/14     (2006.01)
C09D 169/00    (2006.01)

(52) U.S. Cl.
CPC ........... *G03G 5/0564* (2013.01); *C08G 64/14* (2013.01); *C09D 169/00* (2013.01); *G03G 5/0592* (2013.01)

(58) Field of Classification Search
CPC .. G03G 5/0564; G03G 5/0567; G03G 5/0592; C08G 64/16; C08G 64/1616; C08G 64/14; C08G 64/04
USPC ............... 430/59.6, 96; 528/202, 204, 196
See application file for complete search history.

(56) References Cited

U.S. PATENT DOCUMENTS

| | | | |
|---|---|---|---|
| 4,110,311 A | 8/1978 | Cooper et al. | |
| 4,374,233 A | 2/1983 | Loucks et al. | |
| 4,377,662 A * | 3/1983 | Loucks ............... | C08G 64/183 525/394 |
| 4,485,219 A | 11/1984 | Falk et al. | |
| 4,704,430 A | 11/1987 | Freitag et al. | |
| 4,973,628 A * | 11/1990 | Campbell ............ | C08G 64/183 525/132 |
| 6,303,736 B1 | 10/2001 | Kawamura et al. | |
| 9,188,887 B2 | 11/2015 | Hirata | |
| 2006/0194132 A1 * | 8/2006 | Hosoi ................ | G03G 5/08221 430/56 |
| 2013/0337373 A1 | 12/2013 | Hirata | |

FOREIGN PATENT DOCUMENTS

| | | |
|---|---|---|
| CN | 1135501 A | 11/1996 |
| CN | 101654516 A | 2/2010 |
| CN | 103391958 A | 11/2013 |
| EP | 0732366 A2 | 9/1996 |
| EP | 0732366 A3 | 9/1996 |
| JP | 57-177017 A | 10/1982 |
| JP | 57-182318 A | 11/1982 |
| JP | 60-34571 B2 | 8/1985 |
| JP | 62-32143 A | 2/1987 |
| JP | 3-152129 A | 6/1991 |
| JP | 11-172003 A | 6/1999 |
| JP | 2000-105473 A | 4/2000 |
| JP | 3402936 B2 | 5/2003 |
| JP | 2005-139339 A | 6/2005 |
| JP | 2011-26574 A | 2/2011 |
| JP | 2012-51983 A | 3/2012 |
| TW | 201249892 A | 12/2012 |

OTHER PUBLICATIONS

Diamond, A.S., ed. Handbook of Imaging Materials, Marcel Dekker, Inc., NY (1991), pp. 395-396.*
ESPACENET machine-assisted English-language translation of Chinese Patent 101654516 (A) (pub. Feb. 2010).*
International Preliminary Report on Patentability (IPRP) dated Nov. 22, 2016 issued in corresponding PCT/JP2015/064112 application (6 pages).
International Search Report dated Jun. 16, 2015 issued in corresponding PCT/JP2015/064112 application (2 pages).
English Abstract of JP S 57-182318 A published Nov. 10, 1982.
Machine Translation of JP 62-032143 A published Feb. 12, 1987.
English Abstract of JP 03-152129 A published Jun. 28, 1991.
English Abstract of JP H 11-172003 A published Jun. 29, 1999.

(Continued)

*Primary Examiner* — Janis L Dote
(74) *Attorney, Agent, or Firm* — Millen White Zelano and Branigan, PC; John Sopp

(57) ABSTRACT

A polycarbonate copolymer includes a repeating unit A represented by a formula (1) below, chain ends of the PC copolymer being terminated by a monovalent aromatic group or a monovalent fluorine-containing aliphatic group.

$$\left[ \begin{array}{c} (R^1)_L \\ -O-\!\!\!\left\langle\!\!\!\bigcirc\!\!\!\right\rangle\!\!-O-\overset{\displaystyle\phantom{O}}{\underset{\displaystyle O}{C}}- \end{array} \right]_n \quad (1)$$

In the above formula (1), $R^1$ is a hydrogen atom or an alkyl group having 1 to 2 carbon atoms; an average repeating number n is in a range from 6 to 40 and L is an integer of 1 to 4; and when an aromatic ring is substituted by two or more of $R^1$ ($L \geq 2$), the two or more of $R^1$ are the same or different from each other.

18 Claims, No Drawings

(56) References Cited

OTHER PUBLICATIONS

English Abstract of JP 2000-105473 A published Apr. 11, 2000.
English Abstract of JP 3402936 B2 published May 6, 2003.
English Abstract of JP 2005-139339 A published Jun. 2, 2005.
English Abstract of CN 101654516 A published Feb. 24, 2010.
English Abstract of JP 2011-026574 A published Feb. 10, 2011.
English Abstract of JP 2012-051983 A published Mar. 15, 2012.
Chinese Office Action dated May 9, 2018 issued in corresponding CN 201580025171.2 application (19 pages).
Office Action issued in corresponding Taiwan application No. 104115773 dated Nov. 28, 2018 (pp. 1-15).

\* cited by examiner

POLYCARBONATE COPOLYMER, COATING SOLUTION, ELECTROPHOTOGRAPHIC PHOTORECEPTOR, AND ELECTRIC DEVICE

TECHNICAL FIELD

The present invention relates to a polycarbonate copolymer, a coating liquid, an electrophotographic photoreceptor and an electronic device.

BACKGROUND ART

Polycarbonate resin is excellent in mechanical properties, thermal properties and electric properties. Therefore, the polycarbonate resin is used as a raw material of a molding in various industrial fields. In recent years, the polycarbonate resin is widely used in a field of functional products that utilize optical properties of the polycarbonate resin in combination with the above-described properties of the polycarbonate resin. In accordance with such an expansion in application and field, the polycarbonate resin has been demanded to have a variety of performances.

In order to meet such a demand for the polycarbonate resin, polycarbonate copolymers having various chemical structures have been proposed in accordance with intended purposes and required characteristics.

For example, Patent Literature 1 discloses a polycarbonate copolymer obtained through polycondensation of a divalent phenol compound and a bischloroformate oligomer derived from a divalent phenol compound such as a biphenol compound and a bisphenol compound. Patent Literature 2 discloses a polycarbonate copolymer including 4,4'-dihydroxy-3,3'-dimethylphenyl and 1,1-bis(3-methyl-4-hydroxyphenyl)cyclohexane or 2,2-bis(3-methyl-4-hydroxyphenyl)propane(bisphenol C). Patent Literature 3 discloses polyarylate resin including a divalent phenol component and an aromatic dicarboxylic acid component containing 3-tert-butyl-isophthalic acid.

CITATION LIST

Patent Literatures

Patent Literature 1: JP-A-2011-026574
Patent Literature 2: JP-A-2012-051983
Patent Literature 3: Japanese Patent No. 3402936
Patent Literature 4: JP-A-57-177017

SUMMARY OF THE INVENTION

Problems to be Solved by the Invention

Examples of a product using electrical properties and optical properties of the polycarbonate resin include an electrophotographic photoreceptor using the polycarbonate resin as binder resin for functional materials such as a charge generating material and a charge transporting material.

The electrophotographic photoreceptor has been demanded to have a predetermined level of sensitivity, electrical characteristics and optical characteristics in accordance with electrophotographic process.

A surface of a photosensitive layer of the electrophotographic photoreceptor is repeatedly subjected to various processes (e.g., corona electrification, toner development, transfer onto paper and cleaning). At least one of electrical external-forces and mechanical external-forces are applied on the surface of the photosensitive layer every time such processes are performed. Accordingly, in order to maintain electrophotographic image quality for a long period of time, the photosensitive layer formed on the surface of the electrophotographic photoreceptor is required to have durability against these external forces.

It is known that a polycarbonate copolymer is effective for improving a mechanical strength of the photosensitive layer.

For example, a technique of producing the polycarbonate copolymer through copolymerization of a bisphenol Z skeleton excellent in solubility with biphenol excellent in abrasion resistance is known. Patent Literature 1 discloses a polymer produced from a raw material in which the number of monomers in an oligomer is reduced. It is disclosed that a copolymerization ratio of a skeleton of biphenol or the like excellent in abrasion resistance is increased to 25 to 47 mol % and the mechanical strength becomes preferable in the polymer. However, a polycarbonate resin which is further improved in the mechanical strength has been demanded.

Moreover, in recent years, the polycarbonate copolymer which is further improved not only in the mechanical strength but also in the electrical strength has been demanded.

Although the polycarbonate copolymer disclosed in Patent Literature 2 is excellent in the abrasion resistance, the electrical strength of the polycarbonate copolymer is insufficient. Accordingly, the performance of the polycarbonate copolymer is insufficient to be applied to functional products.

Further, although polyarylate resin disclosed in Patent Literature 3 is excellent in the electrical strength, the mechanical strength of the polyarylate resin is insufficient. Accordingly, the performance of the polyarylate resin is insufficient to meet the recent need for high durability.

An object of the present invention is to provide a polycarbonate copolymer excellent in a mechanical strength and an electrical strength, a coating liquid using the polycarbonate copolymer, an electrophotographic photoreceptor excellent in a mechanical strength and an electrical strength and an electronic device using the electrophotographic photoreceptor.

Means for Solving the Problems

As a result of earnest study, an inventor of the present invention found that a polycarbonate copolymer in which PPE (polyphenylene ether) skeleton is copolymerized is excellent in a mechanical strength and an electrical strength, and thereby achieving the invention.

A polycarbonate copolymer according to an aspect of the invention has a repeating unit A represented by a formula (1) below, and chain ends of the polycarbonate copolymer are terminated by a monovalent aromatic group or a monovalent fluorine-containing aliphatic group.

Formula 1

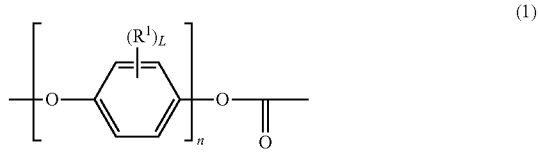

In the above formula (1), $R^1$ is a hydrogen atom or an alkyl group having 1 to 2 carbon atoms, an average repeating number n is in a range from 6 to 40, and L is an integer of 1 to 4. When an aromatic ring is substituted by two or more of $R^1$ (L≥2), the two or more of $R^1$ are the same or different from each other.

A coating liquid according to an aspect of the invention includes a polycarbonate copolymer according to an aspect of the invention and an organic solvent.

An electrophotographic photoreceptor according to an aspect of the invention includes a polycarbonate copolymer according to an aspect of the invention.

An electrophotographic photoreceptor according to an aspect of the invention includes a substrate and a photosensitive layer disposed on the substrate, the photosensitive layer including the polycarbonate copolymer according to an aspect of the invention.

An electronic device according to an aspect of the invention includes an electrophotographic photoreceptor according to an aspect of the invention.

According to the above aspects of the invention, it is possible to provide the polycarbonate copolymer which is extremely excellent in mechanical strength such as abrasion resistance and also excellent in electrical strength against electrical discharge from contact electrification or the like, the coating liquid using the polycarbonate copolymer, the electrophotographic photoreceptor which is excellent in the mechanical strength and the electrical strength, and the electronic device using the electrophotographic photoreceptor.

DESCRIPTION OF EMBODIMENT(S)

A polycarbonate copolymer (hereinafter, also simply referred to as a "PC copolymer") according to an exemplary embodiment of the invention, a coating liquid using the PC copolymer, an electrophotographic photoreceptor using the PC copolymer, and an electronic device using the electrophotographic photoreceptor will be described in detail below.

Structure of PC Copolymer

The PC copolymer of this exemplary embodiment has a repeating unit A represented by a formula (1) below, and chain ends of the PC copolymer are terminated by a monovalent aromatic group or a monovalent fluorine-containing aliphatic group.

Formula 2

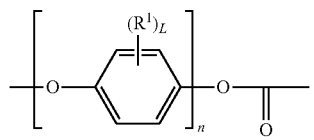

(1)

In the above formula (1), $R^1$ is a hydrogen atom or an alkyl group having 1 to 2 carbon atoms, an average repeating number n is in a range from 6 to 40, and L is an integer of 1 to 4. When an aromatic ring is substituted by two or more of $R^1$, the two or more of $R^1$ are the same or different from each other. In the formula (1), when the aromatic ring is substituted by two or more of $R^1$, L is equal to or more than 2 (L≥2).

In the formula (1), the average repeating number n is preferably in a range from 6 to 30, more preferably in a range from 6 to 25.

It is further preferable that the PC copolymer of this exemplary embodiment has a repeating unit A represented by a formula (1) below and chain ends of the PC copolymer are terminated by a monovalent aromatic group or a monovalent fluorine-containing aliphatic group.

Formula 3

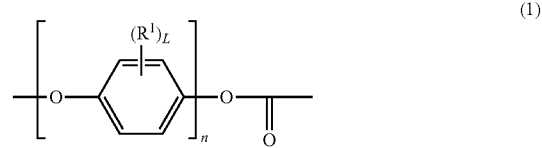

(1)

In the above formula (1), $R^1$ is a hydrogen atom or an alkyl group having 1 to 2 carbon atoms, an average repeating number n is in a range from 6 to 15, and L is an integer of 1 to 4. When an aromatic ring is substituted by two or more of $R^1$, the two or more of $R^1$ are the same or different from each other. In the formula (1), when the aromatic ring is substituted by two or more of $R^1$, L is equal to or more than 2 (L≥2).

The average repeating number n is further preferably in a range from 8 to 13.

According to the invention, the hydrogen atom encompasses isotopes each having different number of neutrons, i.e., protium, deuterium and tritium.

In the formula (1), examples of an alkyl group having 1 to 2 carbon atoms which forms $R^1$ include a methyl group ad an ethyl group, and the methyl group is preferable.

The chain ends of the PC copolymer of this exemplary embodiment are terminated by the monovalent aromatic group or the monovalent fluorine-containing aliphatic group.

The monovalent aromatic group may be a group containing an aliphatic group such as an alkyl group.

The monovalent fluorine-containing aliphatic group may be a group containing an aromatic group.

A substituent such as an alkyl group, a halogen atom and an aryl group may be bonded to the monovalent aromatic group or the monovalent fluorine-containing aliphatic group. A substituent such as an alkyl group, a halogen atom and an aryl group may be further bonded to the substituents described above. Further, when there are a plurality of substituents, these substituents may be bonded to each other to form a ring.

The monovalent aromatic group at the chain ends preferably includes an aryl group having 6 to 12 carbon atoms. Examples of the aryl group include a phenyl group and a biphenyl group.

Examples of a substituent for the aromatic group and a substituent for an alkyl group bonded to the aromatic group include halogen atoms such as a fluorine atom, a chlorine atom and a bromine atom. The substituent bonded to the aromatic group is exemplified by an alkyl group having 1 to 20 carbon atoms. The alkyl group may be a group bonded by a halogen atom and a group bonded by an aryl group, as described above.

The monovalent fluorine-containing aliphatic group at the chain ends is exemplified by a monovalent group derived from fluorine-containing alcohol.

The fluorine-containing alcohol is preferably fluorine-containing alcohol in which a plurality of fluoroalkyl chains each having 2 to 6 carbon atoms are bonded through an ether bond and the total number of fluorine atoms is in a range from 13 to 19. When the total number of fluorine atoms is 13 or more, sufficient water repellency and oil repellency can be developed. In contrast, when the total number of fluorine atoms is 19 or less, a decrease in reactivity upon polymerization can be restrained, and the surface hardness and the heat resistance of the resultant PC copolymer can be improved.

The monovalent fluorine-containing aliphatic group may be a monovalent group derived from fluorine-containing alcohol having two or more ether bonds. By using such fluorine-containing alcohol, the dispersibility of the PC copolymer in the coating liquid is improved, and it becomes possible to increase the abrasion resistance of a molding and an electrophotographic photoreceptor and keep the surface smoothness, water repellency and oil repellency after the abrasion.

Preferable examples of the fluorine-containing alcohol include fluorine-containing alcohol represented by the formula (30) or (31), fluorine-containing alcohol such as 1,1,1,3,3,3-hexafluoro-2-propanol, and fluorine-containing alcohol having the ether bond represented by a formula (32), (33), or (34).

$$H(CF_2)_{n1}CH_2OH \tag{30}$$

$$F(CF_2)_{m1}CH_2OH \tag{31}$$

In the formula (30), n1 is an integer of 1 to 12. In the formula (31), m1 is an integer of 1 to 12.

$$F—(CF_2)_n{}^{31}—OCF_2CH_2—OH \tag{32}$$

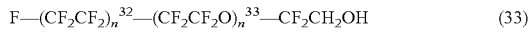

$$F—(CF_2CF_2)_n{}^{32}—(CF_2CF_2O)_n{}^{33}—CF_2CH_2OH \tag{33}$$

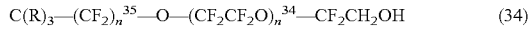

$$C(R)_3—(CF_2)_n{}^{35}—O—(CF_2CF_2O)_n{}^{34}—CF_2CH_2OH \tag{34}$$

In the formula (32), $n^{31}$ is an integer of 1 to 10, and preferably an integer of 5 to 8.

In the formula (33), $n^{32}$ is an integer of 0 to 5, and preferably an integer of 0 to 3. $n^{33}$ is an integer of 1 to 5, and preferably an integer of 1 to 3.

In the formula (34), $n^{34}$ is an integer of 1 to 5, and preferably an integer of 1 to 3. $n^{35}$ is an integer of 0 to 5, and preferably an integer of 0 to 3. R is $CF_3$ or F.

In this exemplary embodiment, for the purpose of improving the electrical characteristics and the abrasion resistance, the chain ends of the PC copolymer are preferably terminated by a monovalent group derived from phenols represented by a formula (9) below, or a monovalent group derived from fluorine-containing alcohols represented by a formula (10).

Formula 4

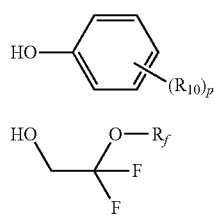

(9)

(10)

In the formula (9), $R_{10}$ is an alkyl group having 1 to 10 carbon atoms or a fluoroalkyl group having 1 to 10 carbon atoms, and p is an integer of 1 to 3.

In the formula (10), $R_f$ is a perfluoroalkyl group having 5 or more carbon atoms and 11 or more fluorine atoms, or a perfluoroalkyloxy group represented by a formula (11) below.

Formula 5

(11)

In the formula (11), $R_{f2}$ is a linear or branched perfluoroalkyl group having 1 to 6 carbon atoms. m is an integer of 1 to 3.

The PC copolymer of this exemplary embodiment preferably has a repeating unit represented by a formula (2) below.

Formula 6

(2)

In the formula (2), Ar is a group represented by a formula (3) below.

Formula 7

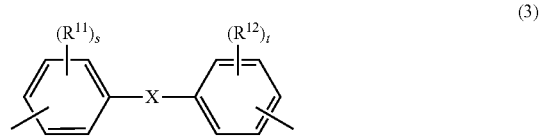

(3)

In the formula (3), $R^{11}$ and $R^{12}$ each independently represent a hydrogen atom, an alkyl group having 1 to 3 carbon atoms, a fluoroalkyl group having 1 to 3 carbon atoms or an alkoxy group having 1 to 3 carbon atoms.

X represents a single bond, —O—, —CO—, —$CR^{13}R^{14}$—, a substituted or unsubstituted cycloalkylidene group having 5 to 10 carbon atoms or a substituted or unsubstituted arylene group having 6 to 13 carbon atoms.

$R^{13}$ and $R^{14}$ each independently represent a hydrogen atom, an alkyl group having 1 to 3 carbon atoms, a perfluoroalkyl group having 1 to 3 carbon atoms, or a substituted or unsubstituted aryl group having 6 to 12 carbon atoms.

s and t are each independently an integer of 1 to 4. When an aromatic ring is substituted by two or more of $R^{11}$, i.e., s≥2, the two or more of $R^{11}$ are the same or different from each other. When an aromatic ring is substituted by two or more of $R^{12}$, i.e., t≥2, the two or more of $R^{12}$ are the same or different from each other.

The PC copolymer of this exemplary embodiment may have a plurality of repeating units each having different Ar as a repeating unit represented by the formula (2).

Above all, as the repeating unit represented by the formula (2), the PC copolymer preferably has a repeating unit B represented by a formula (4) below and a repeating unit C represented by a formula (6) below.

Formula 8

(4)

In the formula (4), $Ar^1$ is a group represented by the formula (5).

Formula 9

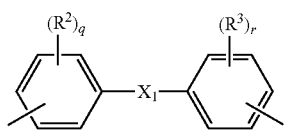

(5)

In the formula (5), $R^2$ and $R^3$ each independently represent a hydrogen atom, an alkyl group having 1 to 3 carbon atoms, a fluoroalkyl group having 1 to 3 carbon atoms or an alkoxy group having 1 to 3 carbon atoms.

$X_1$ represents —$CR^4R^5$—, a substituted or unsubstituted cycloalkylidene group having 5 to 10 carbon atoms or a substituted or unsubstituted arylene group having 6 to 13 carbon atoms.

$R^4$ and $R^5$ each independently represent a hydrogen atom, an alkyl group having 1 to 3 carbon atoms, a perfluoroalkyl group having 1 to 3 carbon atoms or a substituted or unsubstituted aryl group having 6 to 12 carbon atoms. It should be noted that not all of $R^4$ and $R^5$ are hydrogen atoms.

q and r are each independently an integer of 1 to 4. When an aromatic ring is substituted by two or more of $R^2$, i.e., q≥2, the two or more of $R^2$ are the same or different from each other. When an aromatic ring is substituted by two or more of $R^3$, i.e., r≥2, the two or more of $R^3$ are the same or different from each other.

Formula 10

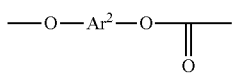

(6)

In the formula (6), $Ar^2$ is a group represented by a formula (7) below. It should be noted that $Ar^2$ has a skeleton different from that of $Ar^1$.

Formula 11

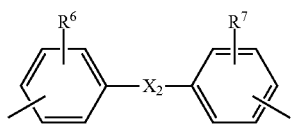

(7)

In the formula (7), $R^6$ and $R^7$ each independently represent a hydrogen atom, an alkyl group having 1 to 3 carbon atoms, a fluoroalkyl group having 1 to 3 carbon atoms or an alkoxy group having 1 to 3 carbon atoms.

$X_2$ represents a single bond, —O—, —CO—, or —$CR^8R^9$—.

$R^8$ and $R^9$ each independently represent a hydrogen atom, an alkyl group having 1 to 3 carbon atoms, a perfluoroalkyl group having 1 to 3 carbon atoms, or a substituted or unsubstituted aryl group having 6 to 12 carbon atoms.

When the PC copolymer of this exemplary embodiment has the repeating unit B represented by the formula (4) and the repeating unit C represented by the formula (6), $Ar^1$ and $Ar^2$ are different from each other.

Examples of the alkyl group having 1 to 3 carbon atoms which forms $R^{11}$, $R^{12}$, $R^2$, $R^3$, $R^6$ and $R^7$ include a linear alkyl or a branched alkyl. A methyl group, an ethyl group and propyl groups are exemplified.

Examples of the fluoroalkyl group having 1 to 3 carbon atoms which forms $R^{11}$, $R^{12}$, $R^2$, $R^3$, $R^6$ and $R^7$ include a group obtained by substituting the alkyl group having 1 to 3 carbon atoms by one or two or more fluorine atoms. The perfluoroalkyl group is preferably used, and a trifluoromethyl group is exemplified.

Examples of the alkoxy group having 1 to 3 carbon atoms which forms $R^{11}$, $R^{12}$, $R^2$, $R^3$, $R^6$ and $R^7$ include a methoxy group, an ethoxy group and propoxy groups.

In the PC copolymer having the repeating unit A represented by the formula (1), the repeating unit B represented by the formula (4) and the repeating unit C represented by the formula (6), a mole percentage of the repeating unit A in the PC copolymer: $\{M_A/(M_A+M_B+M_C)\}\times 100$ is preferably in a range from 1 mol % to 7 mol %, more preferably in a range from 2 mol % to 6 mol %, and further preferably in a range from 2 mol % to 5 mol %, when the mole number of the repeating unit A is denoted by $M_A$, the mole number of the repeating unit B is denoted by $M_B$, the mole number of the repeating unit C is denoted by $M_C$, and the mole percentage of the total mole numbers of the repeating units A, B and C ($M_A+M_B+M_C$) is 100 mol %.

When the mole percentage of the repeating unit A is 1 mol % or more, it is possible to restrain a decrease in the electrical strength, and therefore electrification deterioration hardly occurs. Further, when the mole percentage of the repeating unit A is 7 mol % or less, it is possible to restrain decrease in the mechanical strength. Accordingly, it is possible to more effectively establish both the mechanical strength and the electrical strength. The mechanical strength means the characteristics such as the abrasion resistance. The electrical strength means the characteristics for avoiding electrical deterioration.

The aforementioned mol % is a value obtained when a molar copolymer composition is represented by percentage. The molar copolymer composition can be measured by a nuclear magnetic resonance spectrum, and specifically can be measured by a method described in Examples.

The mole percentage of the repeating unit B in the PC copolymer: $\{M_B/(M_A+M_B+M_C)\}\times 100$ is preferably in a range from 15 mol % to 89 mol %, more preferably in a range from 30 mol % to 79 mol %, further preferably in a range from 50 mol % to 69 mol %, and still further preferably in a range from 54 mol % to 62 mol %.

When the mole percentage of the repeating unit B is 89 mol % or less, the solubility does not become too high, and therefore the resistance to solvent becomes favorable, and generation of cracks can be prevented. When the mole percentage of the repeating unit B is 15 mol % or more, the solubility can be appropriately maintained. Further, when the PC copolymer is dissolved in an organic solvent, the resultant polymer solution is not whitened.

The mole percentage of the repeating unit C in the PC copolymer: $\{M_C/(M_A+M_B+M_C)\}\times 100$ is preferably in a range from 10 mol % to 80 mol %, more preferably in a range from 20 mol % to 70 mol %, further preferably in a range from 30 mol % to 49 mol %, still further preferably in a range from 35 mol % to 43 mol %.

When the mole percentage of the repeating unit C is 80 mol % or less, the ratio of the repeating unit A and the repeating unit B is not decreased, and the effect of the repeating unit A and the effect of the repeating unit B and the repeating unit C can be obtained in a balanced manner. The PC copolymer has appropriate solubility in addition to the electrical strength. When the PC copolymer is dissolved in an organic solvent, the resultant polymer solution is not whitened. Further, the resistance to solvent of the PC copolymer is useful to prevent generation of cracks. When the mole percentage of the repeating unit C is 10 mol % or more, an effect of improving the abrasion resistance by the repeating unit C is sufficiently secured, and the abrasion resistance in the PC copolymer becomes sufficient.

The content of the repeating unit A in the PC copolymer is preferably in a range from 3 wt % to 60 wt %, more preferably in a range from 4 wt % to 40 wt %, further preferably in a range from 5 wt % to 30 wt %, still further preferably in a range from 5 wt % to 20 wt %.

When the content of the repeating unit A is 60 wt % or less, the effect of the repeating unit A and the effect of the repeating unit B and the repeating unit C can be obtained in a balanced manner. The PC copolymer has appropriate solubility in addition to the electrical strength. When the PC copolymer is dissolved in an organic solvent, the resultant polymer solution is not whitened. When the content of the repeating unit A is 3 wt % or more, the abrasion resistance and the effect of the electrical strength by the repeating unit A can be secured sufficiently, and the durability becomes sufficient in the PC copolymer.

Further, since a block component of $Ar^2$ exhibits low solubility, it is preferable that the PC copolymer of this exemplary embodiment does not have a block in which the repeating units C are bonded. In the PC copolymer having no block in which the repeating units C are bonded, when the PC copolymer is dissolved in an organic solvent, the resultant polymer solution is not whitened. Therefore, the PC copolymer can be suitably used in the coating liquid.

In the PC copolymer of this exemplary embodiment, the repeating unit A has resistance to discharge degradation. When the repeating unit A is introduced to a polycarbonate skeleton, the resistance to electrical deterioration (i.e., electrical strength) is improved. When the repeating unit B and the repeating unit C are further introduced to the polycarbonate skeleton as a main skeleton so that the content of the repeating units A, B and C is limited to a particular composition ratio, a PPE-PC copolymer which is more excellent in the mechanical strength such as the abrasion resistance and the electrical strength against electrical discharge from contact electrification or the like can be obtained.

The PC copolymer having the repeating unit A, the repeating unit B and the repeating unit C is preferably presented by the following formula (8).

repeating unit B, i.e., $[\{M_B/(M_A+M_B+M_C)\}\times100]$, and b is preferably in a range from 15 mol % to 89 mol %. c is a value corresponding to the mole percentage of the repeating unit C, i.e., $[\{M_C/(M_A+M_B+M_C)\}\times100]$, and c is preferably in a range from 10 mol % to 80 mol %.

It should be noted that the respective repeating units are not necessarily successive in the formula (8).

The PC copolymer represented by the formula (8) may be any one of a block copolymer, an alternating copolymer and a random copolymer. However, when the PC copolymer represented by the formula (8) is used in the coating liquid as described above, it is preferable that the PC copolymer does not have the block in which the repeating units C are bonded in terms of the solubility.

In this exemplary embodiment, a reduced viscosity $[\eta_{SP}/C]$ of the PC copolymer is a value in a methylene chloride solution of the PC copolymer at a temperature of 20 degrees C. with a concentration of 0.5 g/dL. The reduced viscosity $[\eta_{SP}/C]$ of the PC copolymer of this exemplary embodiment is preferably in a range from 0.60 dL/g to 4.0 dL/g, more preferably in a range from 0.80 dL/g to 3.0 dL/g, further preferably in a range from 0.80 dL/g to 2.5 dL/g. When the reduced viscosity $[\eta_{SP}/C]$ of the PC copolymer for use in the electrophotographic photoreceptor is 0.60 dL/g or more, sufficient abrasion resistance can be secured in the electrophotographic photoreceptor. When the reduced viscosity $[\eta_{SP}/C]$ is 4.0 dL/g or less, an appropriate coating viscosity can be maintained when a molding (the electrophotographic photoreceptor and the like) is manufactured using a coating liquid so that productivity of the molding (the electrophotographic photoreceptor and the like) can be increased.

Incidentally, for the reduced viscosity measurement, an automatic viscosity tester is used. The measurement is performed with an Ubbelohde modified viscometer (type: RM) designed for the automatic viscosity tester.

Manufacturing Method of PC Copolymer

A manufacturing method of the PC copolymer is described hereinbelow with reference to the PC copolymer represented by the formula (8).

The PC copolymer of this exemplary embodiment is obtained by conducting interfacial polycondensation under the presence of an acid-binding agent with use of a bischloroformate oligomer represented by a formula (100) below, a divalent phenol compound represented by a formula (14) below and a polyphenylene ether represented by a formula (12) below so that a carbonate ester bonding can be suitably formed. The PC copolymer of this exemplary embodiment is obtained by conducting interfacial polycondensation under the presence of an acid-binding agent with use of a bischloroformate oligomer represented by a formula (100) below, a divalent phenol compound represented by a formula (13) below, a divalent phenol compound represented by a formula (14) below and a polyphenylene ether represented by a formula (12) below so that a carbonate ester bonding can be suitably formed. The synthesis reaction of those components in the PC copolymer is conducted under the presence Formula 12

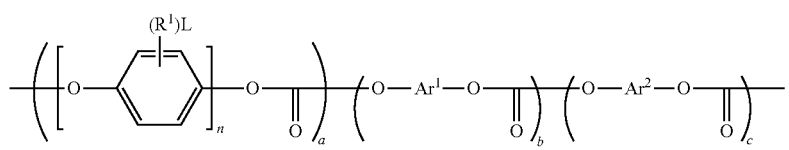

(8)

In the formula (8), a represents a molar copolymerization ratio of the repeating unit A, b represents a molar copolymerization ratio of the repeating unit B, and c represents a molar copolymerization ratio of the repeating unit C.

a is a value corresponding to the mole percentage of the repeating unit A, i.e., $[\{M_A/(M_A+M_B+M_C)\}\times100]$ when the mole percentage of the total mole numbers of the repeating units A, B and C $(M_A+M_B+M_C)$ is 100 mol %. a is preferably in a range from 1 mol % to 7 mol % as described above. b is a value corresponding to the mole percentage of the of at least one of a terminal terminator represented by the formula (9) and a terminal terminator represented by a formula (10) below, for example. Additionally, a branching agent is used as necessary in the synthesis reaction of those components in the PC copolymer.

Formula 13

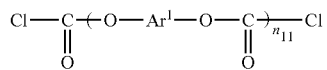

(100)

Formula 14

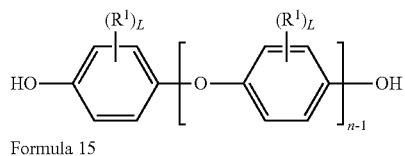

(12)

Formula 15

(13)

(14)

In the formulae (13) and (100), $Ar^1$ is a group represented by the formula (5). In the formula (14), $Ar^2$ is a group represented by the formula (7). Further, $R^1$, n and L in the formula (12) correspond to $R^1$, n and L in the formula (1).

Polyphenylene ether represented by the formula (12) can be prepared by a method known in the art. For example, in accordance with publication of JP-B-60-34571, polymerization of the polyphenylene ether is conducted, a solution just after the polymerization is mixed with a large excess of methanol, and the resultant deposit is mixed with pure methanol and stirred and then subjected to filtration.

Here, $n_{11}$ in the formula (100) represents an average number of monomers of bischloroformate oligomer. The average number of the monomers $n_{11}$ of the bischloroformate oligomer represented by the formula (100) is preferably in a range from 1.0 to 1.3. With the use of the bischloroformate oligomer having the average number of monomers in a range from 1.0 to 1.3, even when the divalent phenol compound represented by the formula (13) and the divalent phenol compound represented by the formula (14) are used together, it is possible to restrain generation of blocks each having a large number of monomers exceeding the number of monomers of the bischloroformate oligomer represented by the formula (100) and it becomes easier to produce the PC copolymer.

It should be noted that, even when the bischloroformate oligomer having the average number of monomers of 1.0 represented by the formula (100) is reacted with a comonomer (e.g., the divalent phenol compound represented by the formula (14)) in a mole ratio of 1:1, the mole percentage of $Ar^1$ exceeds 50 mol % in many cases. This is because, when the manufactured bischloroformate oligomer represented by the formula (100) reacts with the comonomer represented by the formula (14), the chloroformate group at the end of the bischloroformate oligomer sometimes reacts with a base present in the reaction system to form a hydroxyl group, resulting in polycondensation of the hydroxyl group with an $Ar^1$ oligomer (i.e., bischloroformate oligomer represented by the formula (100)) having a chlorine atom at its end.

A method for calculating the average number of monomers $n_{11}$ is exemplified by a method described in Examples later.

The monomer represented by the formula (13) (divalent phenol compound) is exemplified by a biphenol compound. Specific examples of the biphenol compound include 1,1-bis(3-methyl-4-hydroxyphenyl)ethane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 1,1-bis(4-hydroxyphenyl)-1,1-diphenyl methane, 1,1-bis(4-hydroxyphenyl)-1-phenyl ethane, 1,1-bis(4-hydroxyphenyl)-1-phenyl methane, 1,1-bis(4-hydroxyphenyl)cyclopentane, 1,1-bis(3-methyl-4-hydroxyphenyl)cyclopentane, 1,1-bis(4-hydroxyphenyl)cyclohexane, 1,1-bis(4-hydroxyphenyl)-3,3,5-trimethylcyclohexane, 1,1-bis(4-hydroxyphenyl)cyclodecane, 2,2-bis(3-methyl-4-hydroxyphenyl)propane, 1,1-bis(3-methyl-4-hydroxyphenyl)cyclohexane, 1,1-bis(3-methyl-4-hydroxyphenyl)cyclohexane, 2,2-bis(3-trifluoromethyl-4-hydroxyphenyl)ethane, 2,2-bis(3-pentafluoroethyl-4-hydroxyphenyl)ethane, 2,2-bis(3-heptafluoropropyl-4-hydroxyphenyl)ethane, 2,2-bis(2-methyl-4-hydroxyphenyl)propane, 2,2-bis(3-trifluoromethyl-4-hydroxyphenyl)propane, 2,2-bis(3-pentafluoroethyl-4-hydroxyphenyl)propane, 2,2-bis(heptafluoropropyl-4-hydroxyphenyl)propane, 1,1-bis(3-trifluoromethyl-4-hydroxyphenyl)cyclohexane, 1,1-bis(3-pentafluoroethyl-4-hydroxyphenyl)cyclohexane, 1,1-bis(3-heptafluoropropyl-4-hydroxyphenyl)cyclohexane, 9,9-bis(4-hydroxyphenyl)fluorene and 9,9-bis(3-methyl-4-hydroxyphenyl)fluorene.

Among the above examples of biphenol compounds, preferable examples include 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(3-ethyl-4-hydroxyphenyl)cyclohexane, 1,1-bis(4-hydroxyphenyl)-3,3,5-trimethylcyclohexane and 1,1-bis(3-methyl-4-hydroxyphenyl)cyclopentane. When the PC copolymer using the bisphenol compound is adopted as the PC copolymer for an electrophotographic photoreceptor, it is possible to obtain a favorable coating liquid.

The monomer represented by the formula (14) (divalent phenol compound) is exemplified by a biphenol compound and a bisphenol compound. Examples of the biphenol compound and the bisphenol compound include 4,4'-biphenol, 3,3'-dimethyl-4,4'-biphenol, 3,3'-diethyl-4,4'-biphenol, 3,3'-dipropyl-4,4'-biphenol, 3,3'-bis(trifluoromethyl)-4,4'-biphenol, 3,3'-bis(pentafluoroethyl)-4,4'-biphenol, 3,3'-bis(heptafluoropropyl)-4,4'-biphenol, 3,3',5-trimethyl-4,4'-biphenol, 3,3',5,5'-tetramethyl-4,4'-biphenol, 1,1-bis(4-hydroxyphenyl)methane, 1,1-bis(3-methyl-4-hydroxyphenyl)methane, bis(4-hydroxyphenyl)ether, bis(3-methyl-4-hydroxyphenyl)ether, 1,1-bis(3-methyl-4-hydroxyphenyl)ethane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 2,2-bis(3-methyl-4-hydroxyphenyl)propane, 2,2-bis(3-trifluoromethyl-4-hydroxyphenyl)ethane, 2,2-bis(3-pentafluoroethyl-4-hydroxyphenyl)ethane, 2,2-bis(3-heptafluoropropyl-4-hydroxyphenyl)ethane, 2,2-bis(2-methyl-4-hydroxyphenyl)propane, 2,2-bis(3-trifluoromethyl-4-hydroxyphenyl)propane, 2,2-bis(3-pentafluoroethyl-4-hydroxyphenyl)propane and 2,2-bis(3-heptafluoropropyl-4-hydroxyphenyl)propane.

Among the above examples of the biphenol compound and the bisphenol compound, 4,4'-biphenol, 3,3'-dimethyl-4,4'-biphenol, 3,3'-diethyl-4,4'-biphenol, 3,3'-bis(trifluoromethyl)-4,4'-biphenol, 3,3'-bis(pentafluoroethyl)-4,4'-biphenol, 1,1-bis(4-hydroxyphenyl)methane, 1,1-bis(3-methyl-4-hydroxyphenyl)methane, bis(4-hydroxyphenyl)ether, bis(3-methyl-4-hydroxyphenyl)ether, 1,1-bis(3-methyl-4-hydroxyphenyl)ethane and 1,1-bis(4-hydroxyphenyl)ethane are preferable. When the PC copolymer is produced using the above-described compound and used for the electrophotographic photoreceptor, the abrasion resistance of the electrophotographic photoreceptor is further improved.

As the polyphenylene ether compound represented by the formula (12), for example, the compounds represented by the formulae (15) to (17) below are preferably used. $n_{12}$ is an average repeating number.

Formula 16

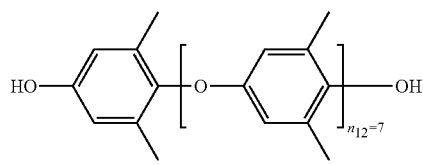

(15)

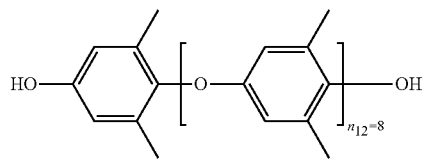

(16)

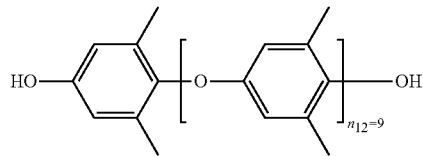

(17)

In the producing method of the PC copolymer of this exemplary embodiment, examples of the terminal terminator for forming the chain ends include a monovalent carboxylic acid and a derivative thereof, or a monovalent phenol.

For instance, p-tert-butyl-phenol, p-phenylphenol, p-cumylphenol, p-perfluorononylphenol, p-(perfluorononylphenyl)phenol, p-(perfluorohexyl)phenol, p-tert-perfluorobutylphenol, p-perfluorooctylphenol, 1-(p-hydroxybenzyl) perfluorodecane, p-[2-(1H,1H-perfluorotridodecyloxy)-1,1,1,3,3,3-hexafluoropropyl]phenol, 3,5-bis (perfluorohexyloxycarbonyl)phenol, p-hydroxyperfluorododecylbenzoate, p-(1H,1H-perfluoro octyloxy)phenol and 2H,2H,9H-perfluorononane acid are preferably used.

Alternatively, as the terminal terminator for forming the chain ends, fluorine-containing alcohol represented by the formula (30) or (31), or monovalent fluorine-containing alcohol such as 1,1,1,3,3,3-hexafluoro-2-propanol is also preferably used. Additionally, fluorine-containing alcohol through the ether bond represented by the formula (32), (33), or (34) is also preferably used.

As the terminal terminator for forming the chain ends, above all, the monovalent phenol represented by the formula (9) or the monovalent fluorine-containing alcohol represented by the formula (10) is preferably used in terms of improvement in the electrical characteristics and abrasion resistance.

Preferable examples of the monovalent phenol represented by the formula (9) include p-tert-butyl-phenol, p-perfluorononylphenol, p-perfluorohexylphenol, p-tert-perfluorobutylphenol and p-perfluorooctylphenol. In other words, according to this exemplary embodiment, the chain end is preferably terminated using the terminal terminator selected from the group consisting of p-tert-butyl-phenol, p-perfluorononylphenol, p-perfluorohexylphenol, p-tert-perfluorobutylphenol and p-perfluorooctylphenol.

Examples of the fluorine-containing alcohol through the ether bond represented by the formula (10) include the following compounds. Specifically, according to this exemplary embodiment, the chain end is also preferably terminated using the terminal terminator selected from the group consisting of the following fluorine-containing alcohols.

Formula 17

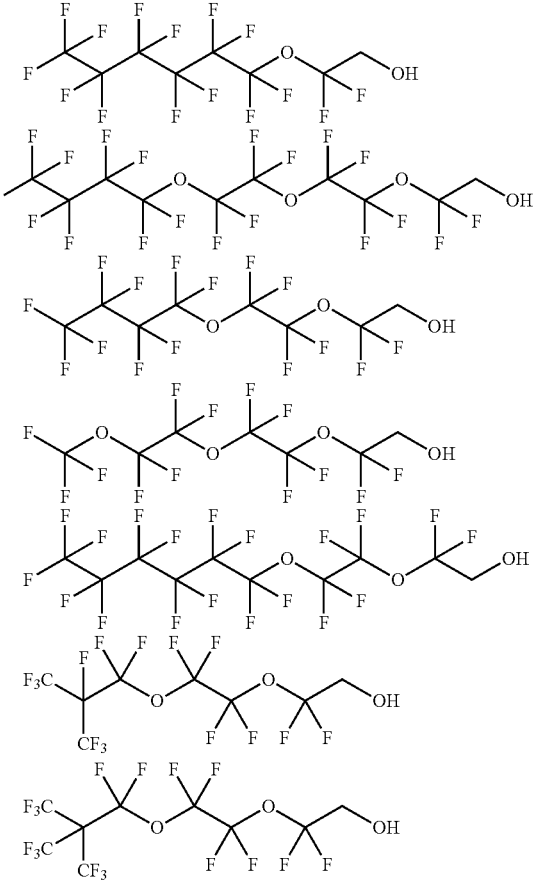

A ratio at which the terminal terminator is added is preferably in a range from 0.05 mol % to 30 mol %, further preferably in a range from 0.1 mol % to 10 mol % at the mole percentage of the copolymer composition including the repeating units A, B and C and the chain ends. When the ratio at which the terminal terminator is added is 30 mol % or less, a decrease in the mechanical strength can be restrained. When the ratio at which the terminal terminator is added 0.05 mol % or more, a decrease in moldability can be restrained.

Further, the branching agent for use in the producing method of the PC copolymer of this exemplary embodiment is not particularly limited. Examples of the branching agent include phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl] propane, 2,4-bis [2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis (4-hydroxyphenyl)methane, tetrakis[4-(4-hydroxyphenyl isopropyl)phenoxy]methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl) oxyindole, 5-chloroisatin, 5,7-dichloroisatin and 5-bromoisatin.

A ratio at which the branching agent is added per the copolymer composition is preferably 30 mol % or less, more preferably 5 mol % or less. When the ratio at which the branching agent is added is 30 mol % or less, a decrease in the moldability can be restrained.

Examples of the acid-binding agent usable in interfacial polycondensation include alkaline metal hydroxides (e.g., sodium hydroxide, potassium hydroxide, lithium hydroxide and cesium hydroxide), alkaline earth metal hydroxides (e.g., magnesium hydroxide and calcium hydroxide), alkali metal weak acid salts (e.g., sodium carbonate, potassium carbonate and calcium acetate), alkali earth metal weak acid salts and an organic base (e.g., pyridine). Preferable examples of the acid-binding agent usable in the interfacial polycondensation include alkaline metal hydroxides (e.g., sodium hydroxide and potassium hydroxide) and alkaline earth metal hydroxides (e.g., calcium hydroxide). These acid binding agents can be used in mixture. Use ratio of the acid-binding agent may be also suitably adjusted in consideration of stoichiometric proportion (equivalent amount) in the reaction. Specifically, per 1 mol of a hydroxyl group of the divalent phenol (raw material), 1 equivalent or more of the acid-binding agent may be used, preferably 1 to 10 equivalent of the acid-binding agent may be used.

As the solvent to be used in the manufacturing method of the PC copolymer of this exemplary embodiment, it is only necessary that the obtained PC copolymer is soluble in the solvent at a predetermined level or higher. Preferable examples of the solvent include aromatic hydrocarbons (e.g., toluene and xylene), halogenated hydrocarbons (e.g., methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2,-tetrachloroethane, pentachloroethane and chlorobenzene), ketones (e.g., cyclohexaneone, acetone and acetophenone), and ethers (e.g., tetrahydrofuran and 1,4-dioxane). One of the above solvents may be singularly used, or two or more of the above may be used together. With use of two solvents that are not miscible with each other, interfacial polycondensation may be conducted.

Further, a catalyst for use in the producing method of the PC copolymer of this exemplary embodiment is not particularly limited. Preferable examples of the catalyst include tertiary amines (e.g., trimethylamine, triethylamine, tributylamine, N,N-dimethylcyclohexyl amine, pyridine, N,N-diethyl aniline and N,N-dimethyl aniline), quaternary ammonium salts (e.g., trimethyl benzyl ammonium chloride, triethyl benzyl ammonium chloride, tributyl benzyl ammonium chloride, trioctyl methyl ammonium chloride, tetrabutyl ammonium chloride and tetrabutyl ammonium bromide), and quaternary phosphonium salts (e.g., tetrabutyl phosphonium chloride and tetrabutyl phosphonium bromide).

Further, a small amount of an antioxidant such as sodium sulfite and hydrosulfite salt may be added to the reaction system of the PC copolymer of this exemplary embodiment as needed.

The manufacturing method of the PC copolymer of this exemplary embodiment is capable of being implemented in various manners in an actual application other than the above-described manufacturing method of the PC copolymer. For instance, a bischloroformate oligomer represented by the formula (100) may be manufactured through a reaction of a divalent phenol compound represented by the formula (13) with phosgene or the like. Next, the bischloroformate oligomer may be reacted with the polyphenylene ether represented by the formula (12), and a divalent phenol compound represented by the formula (14) or divalent phenol compounds represented by the formulae (13) and (14) under the presence of a mixture of the above solvent and an alkali aqueous solution of the above acid-binding agent. This method is preferable in that the mole percentage of the $Ar^1$ skeleton unit (i.e., the repeating unit B represented by the formula (4)) is easily adjustable to a preferable range when the mole percentage of all the repeating units is 100 mol %.

A manufacturing method of the bischloroformate oligomer having a small number of monomers in which the value of $n_{11}$ of the formula (100) is in a range from 1.0 to 1.3 will be detailed later. However, an outline of the method is as follows.

Firstly, the divalent phenol compound represented by the formula (13) is suspended in a hydrophobic solvent such as methylene chloride and then added with phosgene to form a first solution. On the other hand, a tertiary amine such as triethylamine is dissolved in a hydrophobic solvent such as methylene chloride to form a second solution. The second solution is dropped into the first solution for reaction. Hydrochloric acid and deionized water are added to a third solution containing the obtained reactant mixture for cleaning. An organic layer including a polycarbonate oligomer having a small number of monomers is obtained.

A dropping temperature and a reaction temperature are typically in a range of −10 degrees C. to 40 degrees C., preferably in a range of 0 degrees C. to 30 degrees C. Each of the dropping time and the reaction time is typically in a range from 15 minutes to 4 hours, preferably in a range from 30 minutes to about 3 hours. An average number of monomers ($n_{11}$) of thus obtained polycarbonate oligomer is preferably in a range from 1.0 to 1.3, further preferably in a range from 1.0 to 1.2.

The polycarbonate oligomer manufactured by this manufacturing method is preferably used, because the cleaning process in manufacturing the PC copolymer can be simplified.

The divalent phenol compound (monomer) represented by the formula (14) and the polyphenylene ether represented by the formula (12) are added for reaction to the thus obtained organic layer containing the bischloroformate oligomer having a small number of monomers. The reaction temperature is in a range from 0 degrees C. to 150 degrees C., preferably in a range from 5 degrees C. to 40 degrees C., particularly preferably in a range from 7 degrees C. to 20 degrees C.

A reaction pressure may be any one of a reduced pressure, a normal pressure and an added pressure. Typically, the reaction can be suitably performed under a pressure that is approximately equal to the normal pressure or a self-pressure of the reaction system. The reaction time, which is dependent on the reaction temperature, is typically in a range from 0.5 minute to 10 hours, preferably in a range from 1 minute to 3 hours.

In the reaction, the divalent phenol compound represented by the formula (14) and the polyphenylene ether represented by the formula (12) are desirably added in a form of an aqueous solution or an organic-solvent solution. The order of the addition is not specifically limited. In the above manufacturing method, the catalyst, the terminal terminator, the branching agent and the like may be added as needed at the time of manufacturing bischloroformate or at the time of subsequent polymerization reaction, or both at the time of manufacturing bischloroformate oligomer and at the time of subsequent polymerization reaction.

The PC copolymer obtained as described above has the repeating unit A represented by the formula (1), the repeating unit B represented by the formula (4), the repeating unit C represented by the formula (6).

As long as an object of the invention is achievable, the PC copolymer may include a polycarbonate unit having a structure unit other than those of the repeating unit A, the repeating unit B and the repeating unit C, a unit having a polyester structure, and a unit having a polyether structure.

Further, the reduced viscosity $[\eta_{sp}/C]$ of the obtained PC copolymer can be controlled to be within the above-described range by various methods (such as selection of the reaction conditions and adjustment of use amount of the branching agent and the terminal terminator). In addition, if necessary, the obtained PC copolymer may be subjected to at least one of a physical treatment (e.g., mixing and cutoff) and a chemical treatment (e.g., polymer reaction, cross linking and partial degradation), so that the PC copolymer having a predetermined reduced viscosity $[\eta_{sp}/C]$ can be collected.

The obtained reaction product (crude product) may be subjected to various aftertreatments such as known separation and refinement, so that the PC copolymer having desirable purity (desirable refining degree) may be obtained.

Structure of Coating Liquid

A coating liquid according to this exemplary embodiment contains at least the PC copolymer of this exemplary embodiment and an organic solvent capable of dissolving or dispersing the PC copolymer of this exemplary embodiment. Moreover, in addition to the PC copolymer and the organic solvent, the coating liquid may contain a low molecular compound, a colorant (e.g., a dye and a pigment), a functional compound (e.g., a charge transporting material, an electron transporting material, a hole transporting material and a charge generating material), a filler (e.g., such as an inorganic or organic filler, fiber and particles), and an additive such as an antioxidant, a UV absorbent and an acid scavenger. Preferable materials that may be contained besides the PC copolymer are exemplified by materials contained in the components for the electrophotographic photoreceptor described later. The coating liquid may contain other resins as long as the advantages of this exemplary embodiment are not hampered. The coating liquid is exemplified by the following components of the electrophotographic photoreceptor. As the organic solvent usable in this exemplary embodiment, a single solvent may be used or a plurality of solvents may be used in mixture, in consideration of solubility, dispersibility, viscosity, evaporation speed, chemical stability and stability against physical changes of the PC copolymer of this exemplary embodiment and other materials. The organic solvent is exemplified by the components of the electrophotographic photoreceptor described later.

The concentration of the PC copolymer component in the coating liquid according to this exemplary embodiment is appropriately adjusted so that the coating liquid can exhibit a viscosity suitable for usage. The concentration of the PC copolymer component in the coating liquid is preferably in a range from 0.1 mass % to 40 mass %, more preferably in a range from 1 mass % to 35 mass %, further preferably in a range from 5 mass % to 30 mass %. When the concentration of the PC copolymer component in the coating liquid is 40 mass % or less, the viscosity does not become too high, and therefore the coating performance becomes favorable. When the concentration of the PC copolymer component in the coating liquid is 0.1 mass % or more, the suitable viscosity can be kept, and therefore a uniform film can be formed. Additionally, the concentration becomes suitable for shortening a drying time after the coating and easily achieving a target film thickness.

The PC copolymer of this exemplary embodiment has a good compatibility with the charge transporting material and is not whitened or gelled even when dissolved in the organic solvent. Accordingly, even when the coating liquid containing the above-described PC copolymer and organic solvent of this exemplary embodiment further contains a charge transporting material, the coating liquid can be preserved in a stable manner for a long term without causing whitening or gelation of the PC copolymer component. When a photosensitive layer of the electrophotographic photoreceptor is formed with use of the coating liquid (i.e., coating liquid containing the charge transporting material), an excellent electrophotographic photoreceptor having no defect on an image without crystallization of the photosensitive layer is obtainable.

A ratio of the PC copolymer to the charge transporting material in the coating liquid is typically 20:80 to 80:20 by mass, preferably 30:70 to 70:30 by mass.

In the coating liquid according to this exemplary embodiment, one of the above PC copolymers may be singularly used, or two or more of the above PC copolymers may be used together.

In general, the coating liquid of this exemplary embodiment is preferably used for forming the charge transporting layer of a laminated electrophotographic photoreceptor in which a sensitive layer at least includes the charge generating layer and the charge transporting layer. When the coating liquid further contains the charge generating material, the coating liquid is also usable for forming a sensitive layer of a single-layer electrophotographic photoreceptor.

Structure of Molding

A molding can be formed with use of at least one of the PC copolymer of this exemplary embodiment and the coating liquid of this exemplary embodiment.

The molding is exemplified by an optical member, and the optical member is exemplified by the electrophotographic photoreceptor and an optical lens. Further, when a base material is in the form of a film, a laminated film as one of examples of the molding can be used as an in-mold molding film and a decorative film. Additionally, the laminated film is usable as a touch-panel film for use in a liquid display or an organic EL display, an optical film such as an optical compensation film and an antireflection film, and a conductive film.

The molding containing the PC copolymer of this exemplary embodiment is not whitened and is excellent not only in the transparency but also in the mechanical strength such as the abrasion resistance and the electrical strength.

Structure of Electrophotographic Photoreceptor

The electrophotographic photoreceptor of this invention includes the PC copolymer of this exemplary embodiment.

An electrophotographic photoreceptor according to one exemplary embodiment of this invention includes a substrate and a photosensitive layer disposed on the substrate, the photosensitive layer including the PC copolymer of this exemplary embodiment.

The electrophotographic photoreceptor has been demanded to have a predetermined level of sensitivity, electrical characteristics and optical characteristics in accordance with electrophotographic process to be applied. A surface of a photosensitive layer of the electrophotographic photoreceptor is repeatedly subjected to operations such as corona electrification, toner development, transfer onto paper, cleaning and the like. Electrical and mechanical external-forces are applied on the surface of the photosensitive layer every time such operations are performed. Accordingly, the photosensitive layer provided on the surface of the electrophotographic photoreceptor is required to have durability against these external forces in order to maintain electrophotographic image quality for a long period of time. Moreover, since the electrophotographic photoreceptor is typically manufactured by dissolving a functional material and a binder resin in an organic solvent and casting the obtained solution into film on a conductive substrate and the like, the electrophotographic photoreceptor is required to have solubility and stability in the organic solvent.

In order to charge a surface of the electrophotographic photoreceptor, a charge roll is often brought into a direct contact with a surface of a photosensitive drum (i.e., contact electrification method). In order to charge the charge roll, a DC voltage applying method has been considered. However, a DC contact electrification method in which the electrification is conducted in accordance with Paschen's law has a drawback of extremely low stability of a charged state, and charge irregularity in minute scales occur during the electrification. As a result, charged potential irregularity occurs. As a countermeasure against the above, an AC/DC superposed electrification method in which the AC voltage is superposed on the DC voltage was developed. According to the electrification method, the stability during the electrification is considerably improved. However, since the AC voltage is superposed, a discharge amount on the surface of the electrophotographic photoreceptor is extremely increased, and there arises a new problem in which a scraped amount of the electrophotographic photoreceptor is increased. Consequently, not only the mechanical strength but also the electrical strength is required.

In the polycarbonate copolymer disclosed in the above Patent Literature 2, discharging at a contacting nip between the electrophotographic photoreceptor and the charge roll generates bonding breakage between molecules, thereby resulting in electrification deterioration. As a result, the abrasion resistance of the polycarbonate copolymer is significantly decreased. According to the Patent Literature 3, the polyarylate resin is inferior to the polycarbonate resin in the sensitivity and electric characteristics in the electrophotographic process. Therefore, it is difficult to produce the electrophotographic photoreceptor that is excellent in the mechanical strength and the electrical strength and has sufficient sensitivity and electric characteristics in the electrophotographic process.

In contrast, the electrophotographic photoreceptor of this exemplary embodiment using the PC copolymer of this exemplary embodiment in the photosensitive layer is excellent in the mechanical strength such as abrasion resistance and the electrical strength. Accordingly, the electrophotographic photoreceptor having sufficient sensitivity and electric characteristics in the electrophotographic process can be obtained.

As long as the PC copolymer of this exemplary embodiment is used in the photosensitive layer, the electrophotographic photoreceptor of this exemplary embodiment may be any electrophotographic photoreceptor (e.g. one of known various electrophotographic photoreceptors). However, the photosensitive layer of the electrophotographic photoreceptor is preferably a layered electrophotographic photoreceptor including at least one charge generating layer and at least one charge transporting layer, or alternatively the photosensitive layer of the electrophotographic photoreceptor is preferably a single-layer electrophotographic photoreceptor including both a charge generating material and a charge transporting material.

While the PC copolymer may be used in any portion of the photosensitive layer, in order for the invention to sufficiently provide an advantage, the PC copolymer is preferably used as the binder resin of the charge transporting material in the charge transporting layer or as the binder resin of the single photosensitive layer. Additionally, the PC copolymer is preferably used not only for the photosensitive layer but also for a surface protecting layer. When the electrophotographic photoreceptor has double charge transporting layers (i.e., multilayer electrophotographic photoreceptor), the PC copolymer is preferably used in either one of the charge transporting layers.

In the electrophotographic photoreceptor of this exemplary embodiment, one type of the PC copolymer of this exemplary embodiment may be singularly used, or two or more types thereof may be used together. Further, as long as an object of the invention is not hampered, a binder-resin component such as another polycarbonate may be contained. In addition, an additive such as an antioxidant may be contained.

The electrophotographic photoreceptor according to this exemplary embodiment includes a conductive substrate and a photosensitive layer on the conductive substrate. When the photosensitive layer has a charge generating layer and a charge transporting layer, the charge transporting layer may be laminated on the charge generating layer, or in contrast, the charge generating layer may be laminated on the charge transporting layer. Further alternatively, a single photosensitive layer of the electrophotographic photoreceptor may contain both the charge generating material and the charge transporting material. When necessary, a surface layer of the electrophotographic photoreceptor may be provided with a conductive or insulating protective film. It is possible to obtain the electrophotographic photoreceptor which is excellent in the mechanical strength and the electrical strength and has sufficient sensitivity and electric characteristics in the electrophotographic process by using the PC copolymer of this exemplary embodiment as the surface layer.

The electrophotographic photoreceptor may be further provided with an intermediate layer such as adhesive layer for enhancing adhesion between layers and a blocking layer for blocking charges.

Various conductive substrate materials (e.g., known materials) are usable for forming the electrophotographic photoreceptor of this exemplary embodiment. Examples of such conductive substrate materials include: a plate, a drum and a sheet made of material such as aluminum, nickel, chrome, palladium, titanium, molybdenum, indium, gold, platinum, silver, copper, zinc, brass, stainless steel, lead oxide, tin oxide, indium oxide, ITO (indium tin oxide: tin-doped indium oxide) and graphite; glass, cloth, paper, plastic film, plastic sheet and seamless belt having been treated with conductive treatment through coating by vapor deposition, sputtering or application; and a metal drum having been treated with metal oxidation treatment by electrode oxidation and the like.

The charge generating layer contains at least the charge generating material. The charge generating layer can be obtained by forming a layer of the charge generating material on the underlying substrate by vacuum deposition, sputtering or the like, or by forming a layer in which the charge generating material is bound onto the underlying substrate with use of a binder resin. Various methods (e.g., known methods) are usable for forming the charge generating layer with use of a binder resin. In general, the charge transporting layer is preferably obtained as a wet molding formed by applying a coating liquid in which both the charge transporting material and the binder resin are dispersed or dissolved in a suitable solvent onto a predetermined underlying substrate and drying the applied coating liquid, for example.

Various known materials are usable as the charge generating material in the charge generating layer. Examples of such materials include: elementary selenium (e.g., amorphous selenium and trigonal selenium), selenium alloy (e.g., selenium-tellurium), selenium compound or selenium-containing composition (e.g., $As_2Se_3$), inorganic material formed of 12 group element(s) and 16 group element(s) in the periodic system (e.g., zinc oxide and CdS—Se), oxide-base semiconductor (e.g., titanium oxide), silicon-base material (e.g., amorphous silicon), metal-free phthalocyanine pigment (e.g., τ-type metal-free phthalocyanine and χ-type metal-free phthalocyanine), metal phthalocyanine pigment (e.g., α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxo-titanyl phthalocyanine, titanyl phthalocyanine whose black angle 2θ has its diffraction peak at 27.3±0.2 degrees in a X-ray diffraction diagram, and gallium phthalocyanine), cyanine dye; anthracene pigment; bisazo pigment; pyrene pigment; polycyclic quinone pigment; quinacridone pigment; indigo pigment; perylene pigment; pyrylium dye; squarium pigment; anthanthrone pigment; benzimidazole pigment; azo pigment; thioindigo pigment; quinoline pigment; lake pigment; oxazine pigment; dioxazine pigment; triphenylmethane pigment; azulenium dye; triarylmethane dye; xanthine dye; thiazine dye; thiapyrilium dye; polyvinyl carbazole; and bisbenzimidazole pigment. One of the above compounds may be singularly used, or two or more of them may be mixed for use as the charge generating material. Among the above charge generating materials, a charge generating material specifically disclosed in JP-A-11-172003 is preferable.

The charge transporting layer can be obtained as a wet molding by forming a layer in which the charge transporting material is bound onto the underlying substrate by a binder resin.

The binder resin for the charge generating layer and the charge transporting layer is not specifically limited. Various known resins are usable. Examples of such resins include polystyrene, polyvinyl chloride, polyvinyl acetate, vinyl chloride-vinyl acetate copolymer, polyvinyl acetal, alkyd resin, acrylic resin, polyacrylonitrile, polycarbonate, polyurethane, epoxy resin, phenol resin, polyamide, polyketone, polyacrylamide, butyral resin, polyester resin, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol-formaldehyde resin, styrene-alkyd resin, melamine resin, polyether resin, benzoguanamine resin, epoxy-acrylate resin, urethane acrylate resin, poly-N-vinylcarbazole, polyvinyl butyral, polyvinyl formal, polysulphone, casein, gelatine, polyvinyl alcohol, ethyl cellulose, cellulose nitrate, carboxymethyl cellulose, vinylidene chloride-base polymer latex, acrylonitrile-butadiene copolymer, vinyl toluene-styrene copolymer, soybean oil-modified alkyd resin, nitrated polystyrene, polymethylstyrene, polyisoprene, polythiocarbonate, polyarylate, polyhaloarylate, polyallyl ether, polyvinyl acrylate and polyester acrylate.

One of the above resins may be singularly used, or two or more of them may be mixed for use. The binder resin used in the charge generating layer and/or the charge transporting layer is preferably the PC copolymer of this exemplary embodiment.

While various known methods are usable for forming the charge transporting layer, the charge transporting layer is preferably obtained as a wet molding formed by applying a coating liquid in which both the charge transporting material and the PC copolymer of this exemplary embodiment are dispersed or dissolved in a suitable solvent onto a predetermined underlying substrate and drying the applied coating liquid. For forming the charge transporting layer, the charge transporting material and the PC copolymer are mixed together preferably by a mass ratio of 20:80 to 80:20, more preferably 30:70 to 70:30.

In the charge transporting layer, one type of the PC copolymer of this exemplary embodiment may be singularly used, or two or more types thereof may be used together. As long as an object of the invention is not hampered, the charge transporting layer may also contain another binder resin in addition to the PC copolymer of this exemplary embodiment.

The thickness of the charge transporting layer thus formed is typically approximately in a range from 5 μm to 100 μm, preferably in a range from 10 μm to 30 μm. When the thickness of the charge transporting layer is 5 μm or more, the initial potential does not become low. When the thickness of the charge transporting layer is 100 μm or less, degradation of electrophotographic characteristics can be prevented.

Various known compounds are usable as the charge transporting material that is usable together with the PC copolymer of this exemplary embodiment. Preferable examples of such compounds include carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, quinone compound, quinodimethane compound, thiazole compound, triazole compound, imidazolone compound, imidazolidine compound, bisimidazolidine compound, oxazolone compound, benzothiazole compound, benzimidazole compound, quinazoline compound, benzofuran compound, acridine compound, phenazine compound, poly-N-vinylcarbazole, polyvinyl pyrene, polyvinyl anthracene, polyvinyl acridine, poly-9-vinyl phenyl anthracene, pyrene-formaldehyde resin, ethylcarbazole resin, and a polymer having the above structure in the main chain or side chain. One of the above compounds may be singularly used, or two or more of the above may be used together.

Among the above charge transporting materials, a compound specifically disclosed in JP-A-11-172003 and a charge transporting substance represented by the following structures are particularly preferably usable.

Formula 18

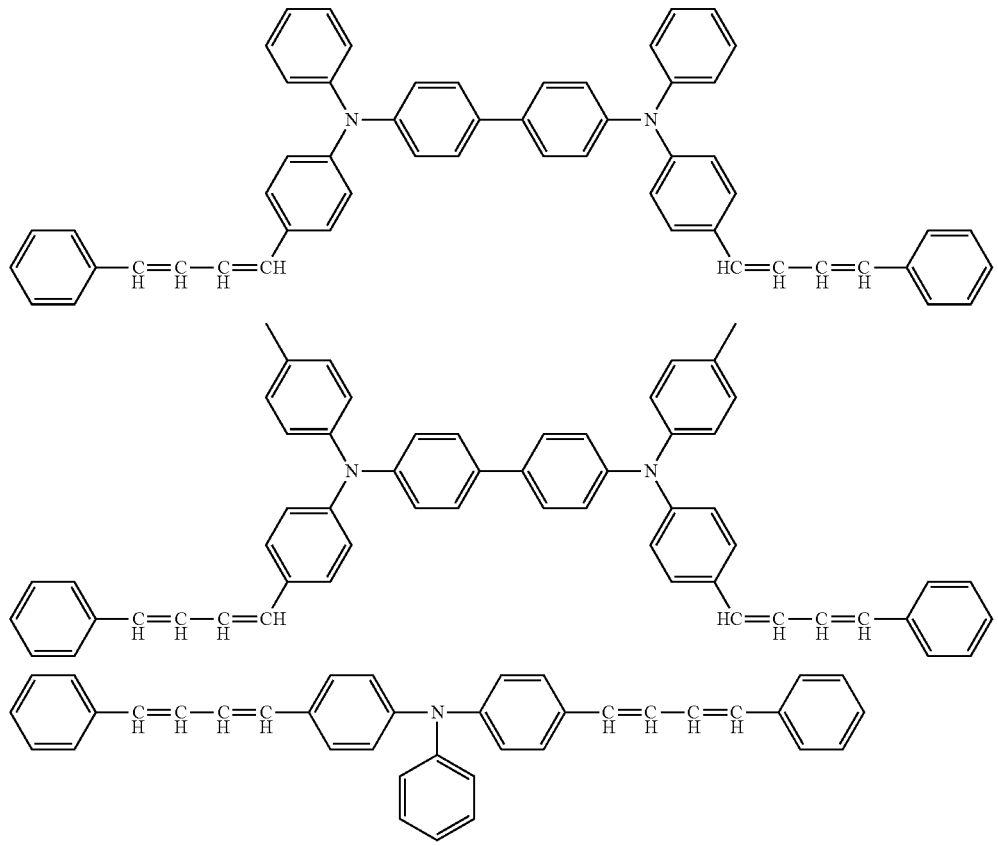

Formula 19

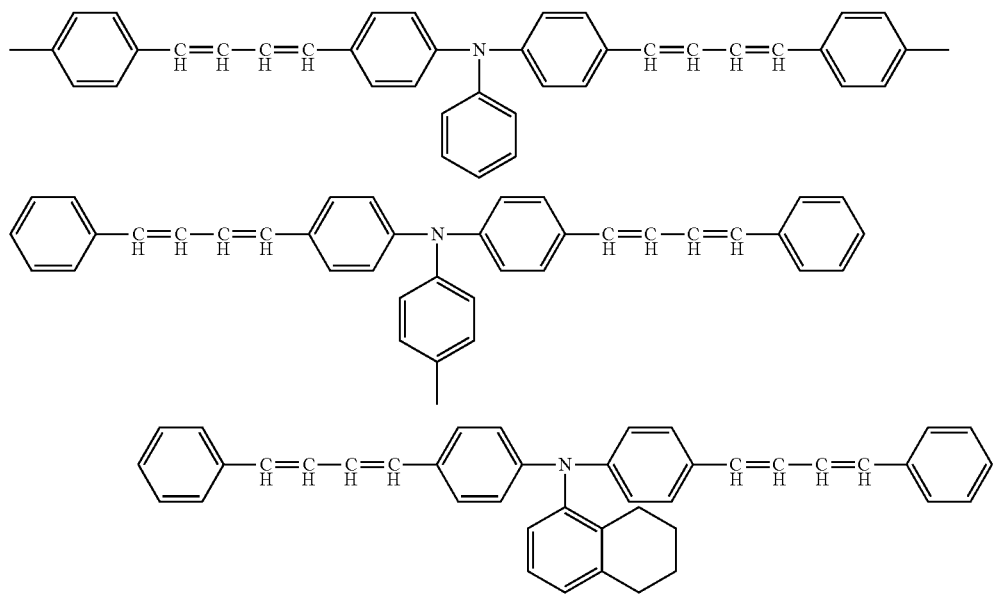

-continued
Formula 20
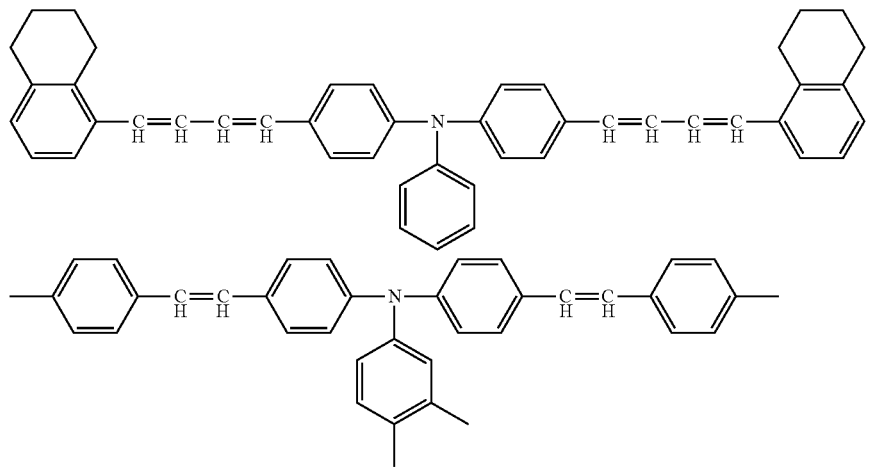
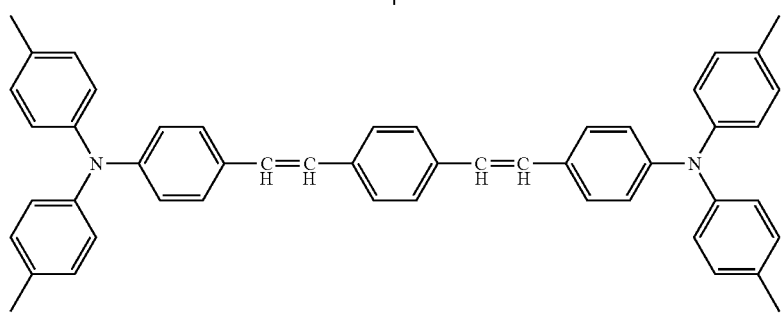
Formula 21
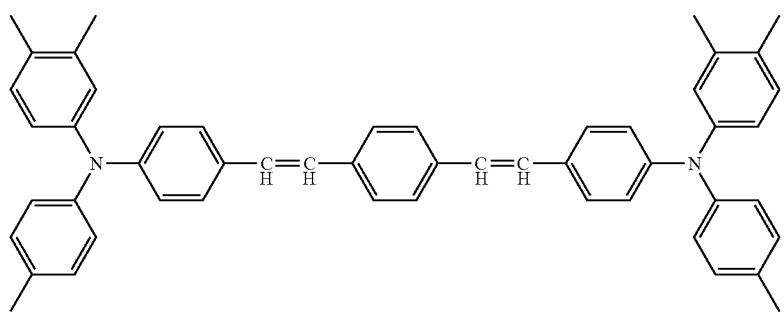
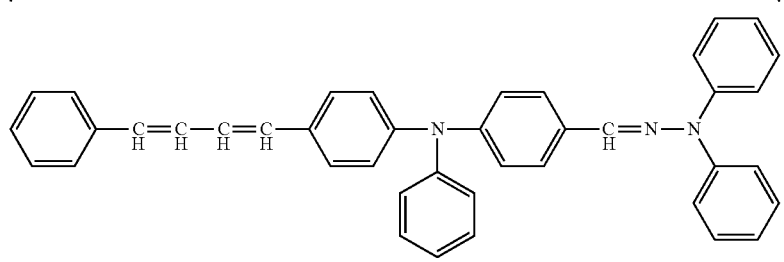
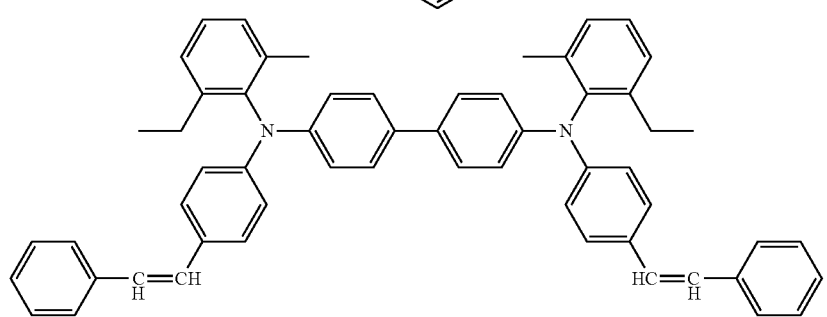

Formula 22
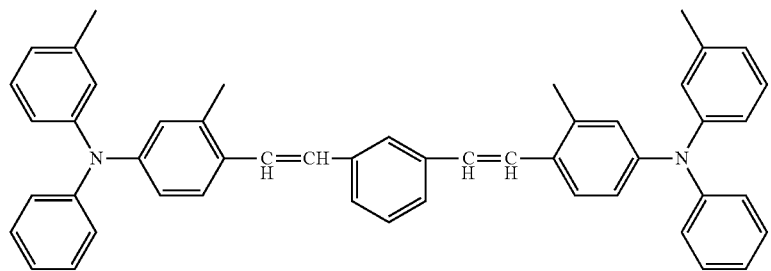
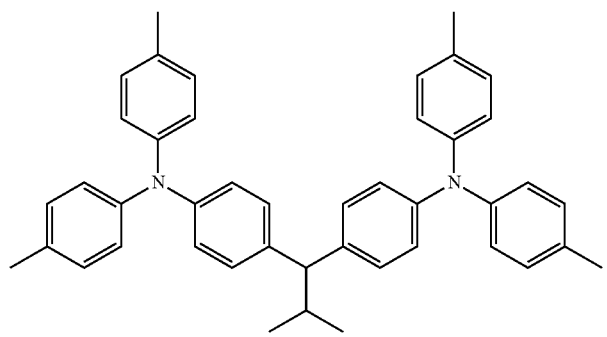
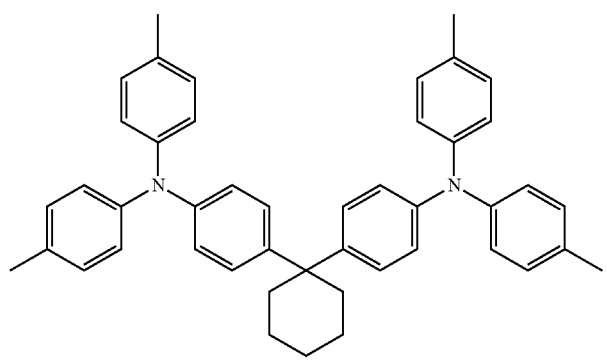
Formula 23
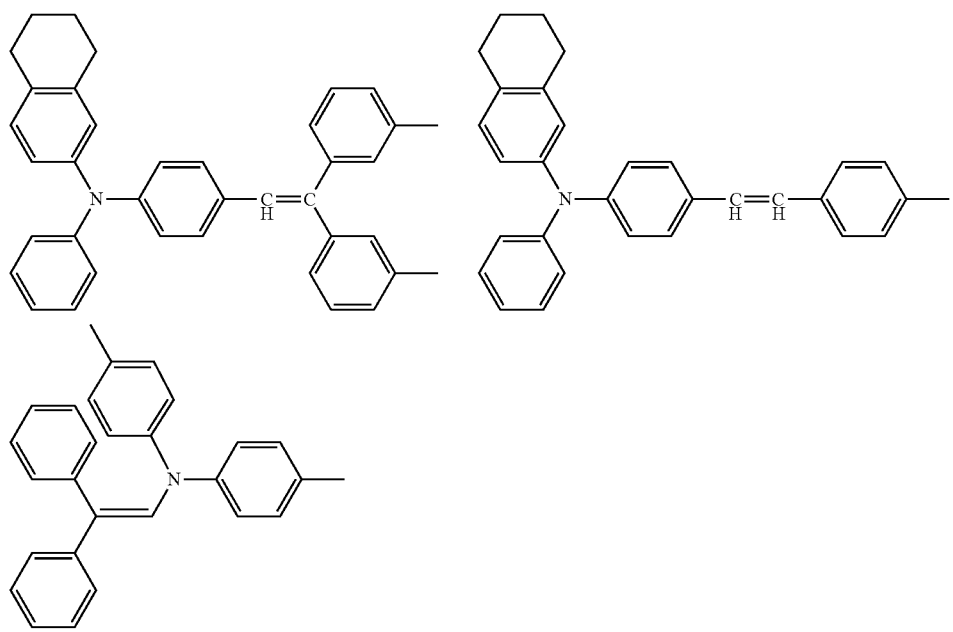

-continued
Formula 24
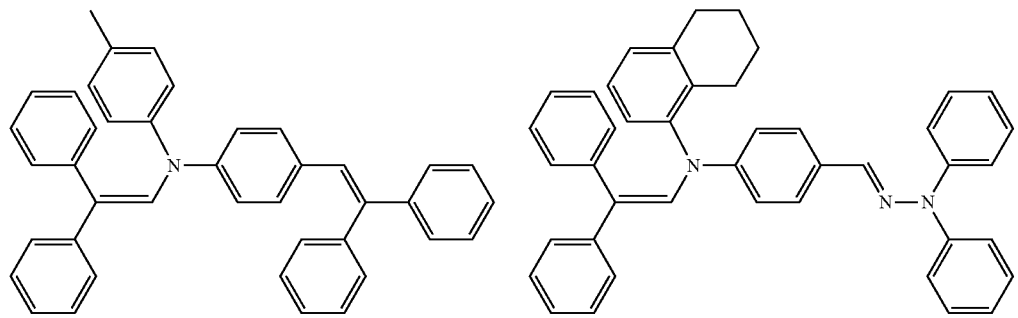
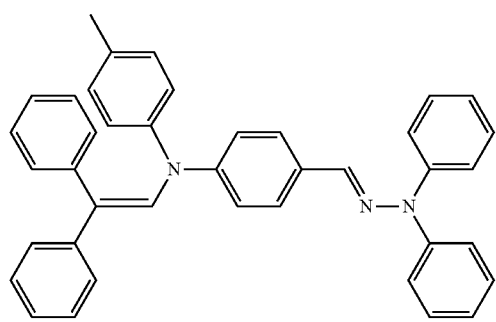
Formula 25
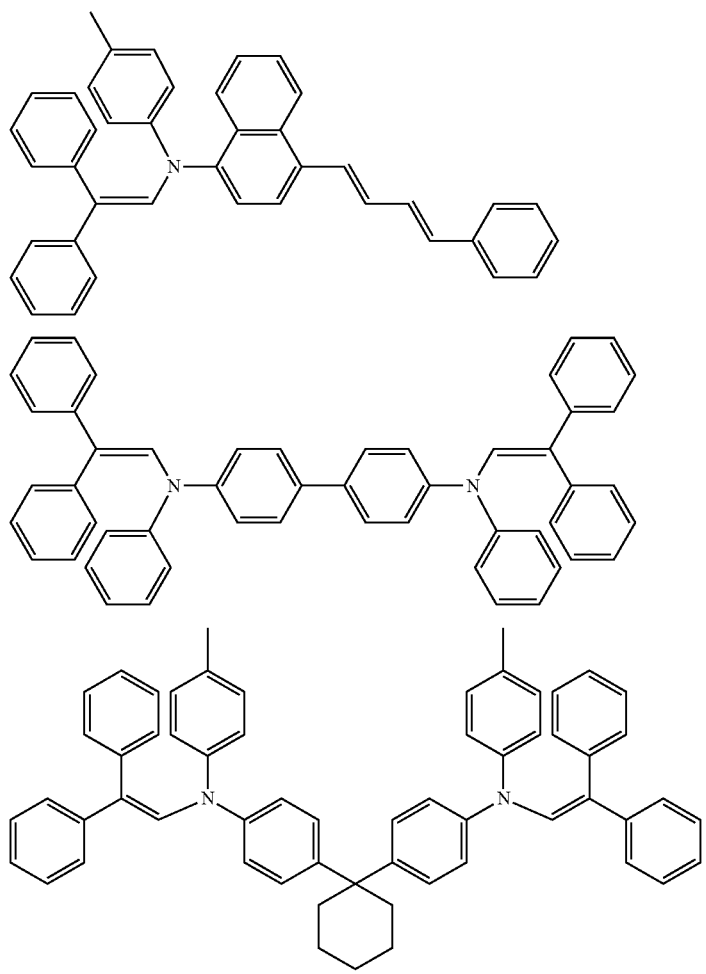

Formula 26
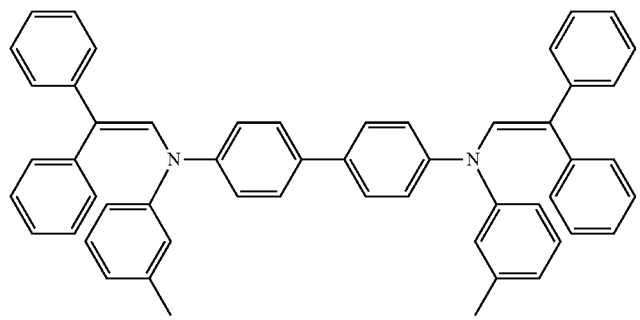
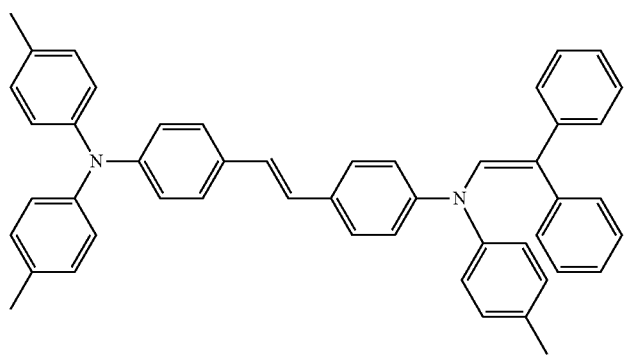
Formula 27
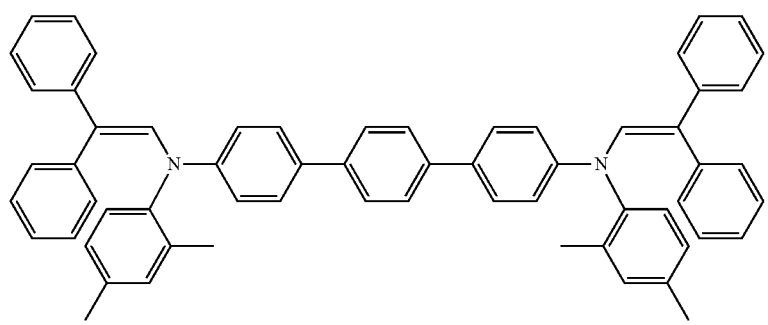
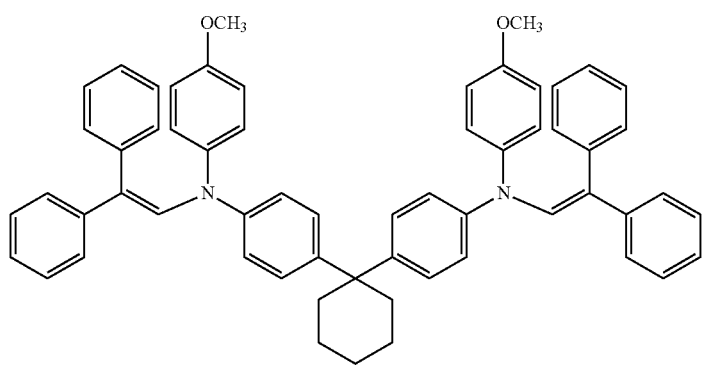

-continued
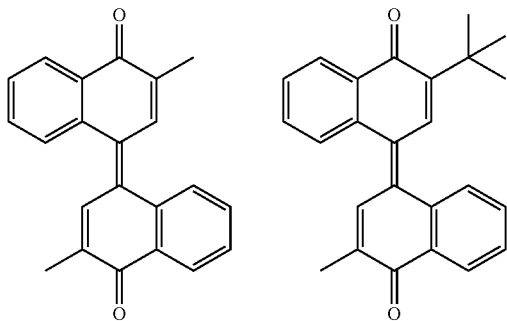
Formula 28
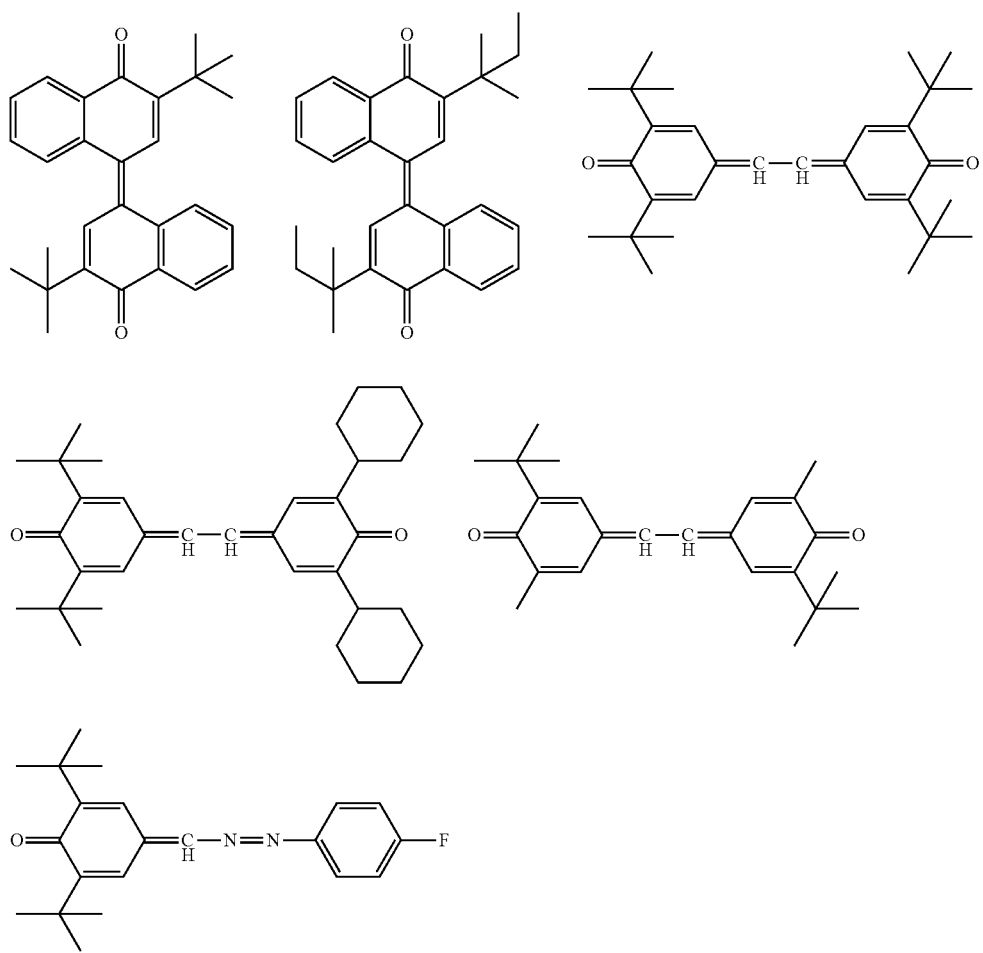
Formula 29
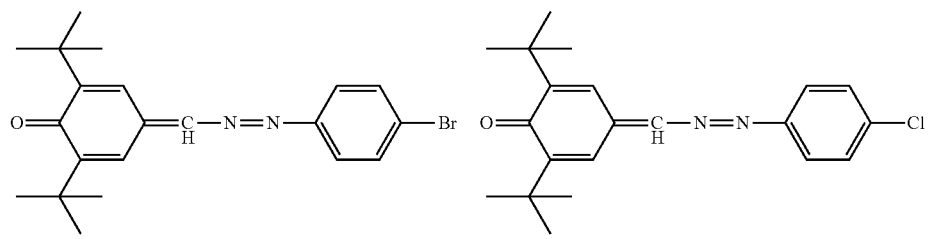

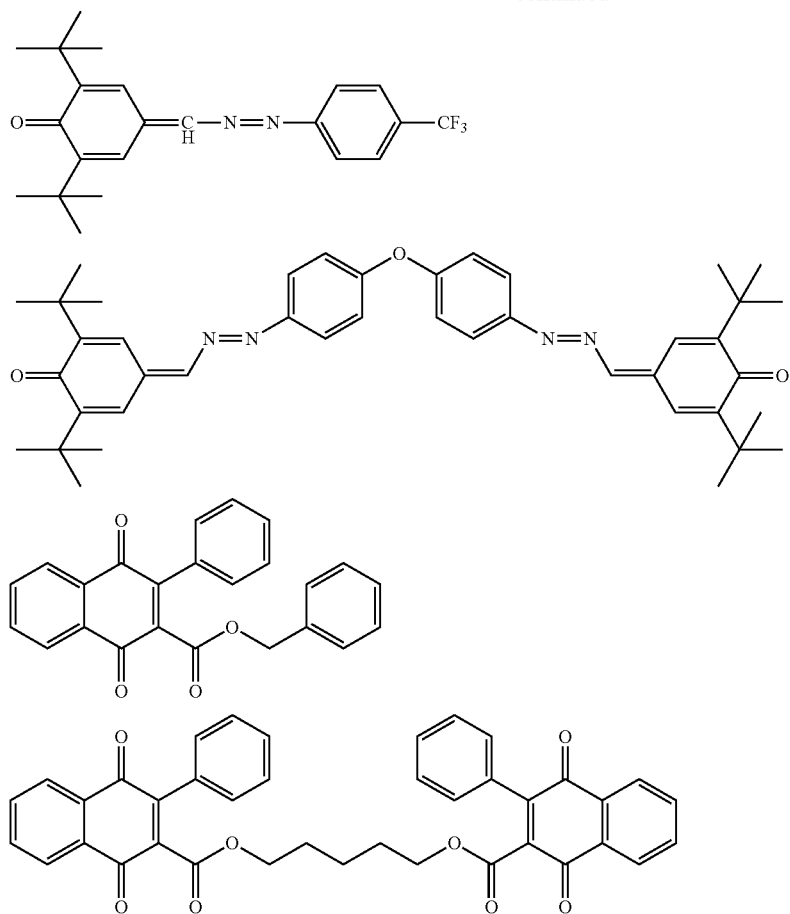
Formula 30
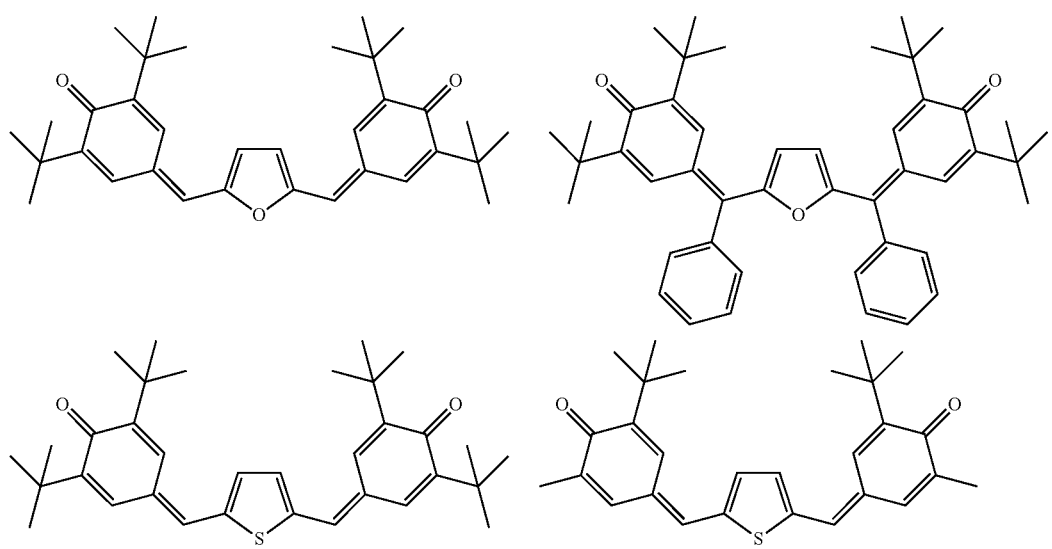
Formula 31
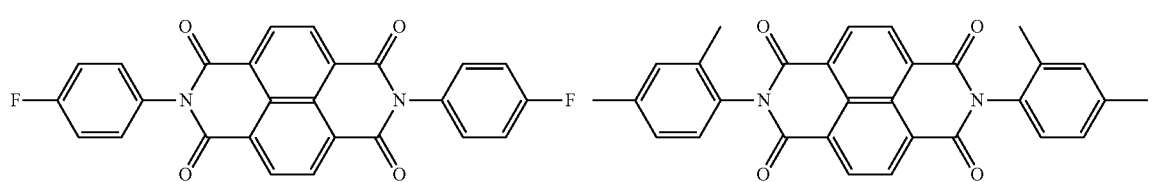

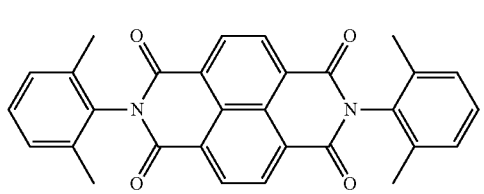 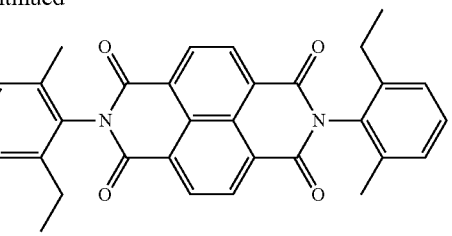

In the electrophotographic photoreceptor of this exemplary embodiment, the PC copolymer of this exemplary embodiment is preferably used as the binder resin in at least either one of the charge generating layer and the charge transporting layer.

The electrophotographic photoreceptor of this exemplary embodiment may be provided with a typically-used undercoat layer between the conductive substrate and the photosensitive layer. Examples of the undercoat layer include particles (e.g., titanium oxide, aluminum oxide, zirconia, titanic acid, zirconic acid, lanthanum lead, titanium black, silica, lead titanate, barium titanate, tin oxide, indium oxide and silicon oxide), and components such as polyamide resin, phenol resin, casein, melamine resin, benzoguanamine resin, polyurethane resin, epoxy resin, cellulose, cellulose nitrate, polyvinyl alcohol and polyvinyl butyral resin. The resin usable for the undercoat layer may be the above binder resin or the PC copolymer of this exemplary embodiment. One of the above particles and the resins may be singularly used or a variety thereof may be mixed together in use. When a mixture thereof is used, a combination of inorganic particles and resin is preferable because a flat and smooth film can be made.

The thickness of the undercoat layer is in a range from 0.01 μm to 10 μm, preferably in a range from 0.1 μm to 7 μm. When the thickness of the undercoat layer is 0.01 μm or more, it becomes possible to form an even undercoat layer. On the other hand, when the thickness of the undercoat layer is 10 μm or less, it is possible to prevent degradation of the electrophotographic characteristics.

The electrophotographic photoreceptor of this exemplary embodiment may be provided with a typically-used known blocking layer between the conductive substrate and the photosensitive layer. The blocking layer may be made of the same resin as the binder resin. Alternatively, the blocking layer may be made of the PC copolymer of this exemplary embodiment. The thickness of the blocking layer is in a range from 0.01 μm to 20 μm, preferably in a range from 0.1 μm to 10 μm. When the thickness of the blocking layer is 0.01 μm or more, it becomes possible to form an even blocking layer. On the other hand, when the thickness thereof is 20 μm or less, it is possible to prevent degradation of the electrophotographic characteristics.

The electrophotographic photoreceptor of this exemplary embodiment may be further provided with a protective layer laminated on the photosensitive layer. The protective layer may be made of the same resin as the binder resin. Alternatively, it is further preferable that the protective layer is the PC copolymer of this exemplary embodiment. The thickness of the protective layer is in a range from 0.01 μm to 20 μm, preferably in a range from 0.1 μm to 10 μm. The protective layer may contain a conductive material such as the charge generating material, the charge transporting material, an additive, a metal, oxide of the metal, nitride of the metal, salt of the metal, alloy of the metal, carbon black and an organic conductive compound.

In order to enhance performance of the electrophotographic photoreceptor, the charge generating layer and the charge transporting layer may be added with a binder, a plasticizer, a curing catalyst, a fluidity adder, a pinhole controller and a spectral-sensitivity sensitizer (sensitizer dye). In addition, in order to prevent increase in residual potential after repeated use, reduction in charged potential and deterioration in sensitivity, various chemical substances and additives such as antioxidant, surfactant, curl inhibitor and leveling agent may be added.

Examples of the binders include silicone resin, polyamide resin, polyurethane resin, polyester resin, epoxy resin, polyketone resin, polycarbonate copolymer, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, cellulose nitrate resin, urea resin, phenol resin, phenoxy resin, polyvinyl butyral resin, formal resin, vinyl acetate resin, vinyl acetate/vinyl chloride copolymer resin, and polyester carbonate resin. In addition, at least one of a thermoset resin and a light-curable resin is also usable. The binder is not specifically limited to the above, as long as the binder is an electric-insulating resin from which a film is formable under normal conditions, and as long as an advantage of the invention is not hampered.

Examples of the plasticizer include biphenyl, chlorinated biphenyl, o-terphenyl, halogenated paraffin, dimethylnaphthalene, dimethyl phthalate, dibutyl phthalate, dioctyl phthalate, diethylene glycol phthalate, triphenyl phosphate, diisobutyl adipate, dimethyl sebacate, dibutyl sebacate, laurate butyl, methylphthalyl ethyl glycolate, dimethyl glycol phthalate, methylnaphthalene, benzophenone, polypropylene, polystyrene, and fluorohydrocarbon.

Examples of the curing catalyst include methanesulfonic acid, dodecylbenzenesulfonic acid and dinonylnaphthalene disulfonic acid. Examples of the fluidity adder include Modaflow™ and Acronal 4F™. Examples of the pinhole controller include benzoin and dimethyl phthalate. The above plasticizer, curing catalyst, fluidity adder and pinhole controller are preferably contained at a content of 5 mass % or less of the charge transporting material.

When a sensitizer dye is used as a spectral-sensitivity sensitizer, suitable examples of the sensitizer dye include triphenylmethane-base dye (e.g., methyl violet, crystal violet, night blue and Victria blue), acridine dye (e.g., erythrosine, Rhodamine B, Rhodamine 3R, acridine orange and frapeosine), thiazine dye (e.g., methylene blue and methylene green), oxazine dye (e.g., capri blue and meldra blue), cyanine dye, merocyanine dye, styryl dye, pyrylium salt dye and thiopyrylium salt dye.

In order to enhance the sensitivity, reduce the residual potential and reduce fatigue due to repeated use, the photosensitive layer may be added with an electron-accepting material. Preferable examples of the electron-accepting material include compounds having high electron affinity such as succinic anhydride, maleic anhydride, dibromo maleic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic anhydride, tetracyanoethylene, tetracyanoquinodimethane, o-dinitro benzene, m-dinitro benzene, 1,3,5-trinitro benzene, p-nitrobenzonitrile, picryl chloride, quinone chlorimide, chloranil, bromanil, benzoquinone, 2,3-dichloro benzoquinone, dichloro dicyano parabenzoquinone, naphthoquinone, diphenoquinone, tropoquinone, anthraquinone, 1-chloro anthraquinone, dinitro anthraquinone, 4-nitrobenzophenone, 4.4-dinitrobenzophenone, 4-nitrobenzal malonodinitrile, α-cyano-β-(p-cyanophenyl)ethyl acrylate, 9-anthracenyl methylmalonodinitrile, 1-cyano-(p-nitrophenyl)-2-(p-chlorophenyl)ethylene, 2,7-dinitro fluorenone, 2,4,7-trinitro fluorenone, 2,4,5,7-tetranitro fluorenone, 9-fluorenylidene-(dicyano methylene malononitrile), polynitro-9-fluorenylidene-(dicyano methylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either the charge generating layer or the charge transporting layer. An additive ratio of the compounds is in a range from 0.01 to 200 parts by mass, preferably in a range from 0.1 to 50 parts by mass, per 100 parts by mass of the charge generating material or the charge transporting material.

Further, in order to improve surface quality, tetrafluoroethylene resin, trifluoroethylene chloride resin, tetrafluoroethylene hexafluoropropylene resin, vinyl fluoride resin, vinylidene fluoride resin, difluoroethylene dichloride resin, copolymer(s) thereof, or fluorine-base graft polymer may be used. An additive ratio of such surface modifiers is in a range from 0.1 mass % to 60 mass % of the binder resin, preferably in a range from 5 mass % to 40 mass %. When the additive ratio is 0.1 mass % or more, surface modification such as enhancement of surface durability and reduction in surface energy becomes sufficient. When the additive ratio is 60 mass % or less, degradation of the electrophotographic characteristics does not occur.

Preferable examples of the antioxidant include a hindered phenol-base antioxidant, aromatic amine-base antioxidant, hindered amine-base antioxidant, sulfide-base antioxidant and organophosphate-base antioxidant. An additive ratio of such antioxidants is typically in a range from 0.01 mass % to 10 mass %, preferably in a range from 0.1 mass % to 2 mass %, of the charge transporting material.

Preferable examples of such antioxidants include compounds represented by chemical formulae [Chemical Formula 94] to [Chemical Formula 101] disclosed in the specification of JP-A-11-172003.

One of the above antioxidants may be singularly used, or two or more of them may be mixed in use. In addition to the photosensitive layer, the above antioxidant may be added to the surface protecting layer, the undercoat layer and the blocking layer.

Examples of the solvent usable in forming the charge generating layer and/or the charge transporting layer include aromatic solvent (e.g., benzene, toluene, xylene and chlorobenzene), ketone (e.g., acetone, methyl ethyl ketone and cyclohexaneone), alcohol (e.g., methanol, ethanol and isopropanol), ester (e.g., acetic ether and ethyl cellosolve), halogenated hydrocarbon (e.g., carbon tetrachloride, carbon tetrabromide, chloroform, dichloromethane and tetrachloroethane), ether (e.g., tetrahydrofuran, dioxolane and dioxane), sulfoxide (e.g., dimethylsulfoxide) and amide (e.g., dimethylformamide and diethyl formamide). One of the above solvents may be singularly used, or two or more of them may be used together as a mixture solvent.

The photosensitive layer of a single-layer electrophotographic photoreceptor can be easily formed by applying the PC copolymer of this exemplary embodiment as the binder resin with use of the charge generating material, the charge transporting material and the additive. The charge transporting material is preferably added with at least one of the above-described hole transporting material and an electron transporting material. A charge transporting material disclosed in JP-A-2005-139339 can be suitably applied as the electron transporting material.

Various coating applicators (e.g., known applicators) can perform application of each layer. Examples of such a coating applicator include an applicator, a spray coater, a bar coater, a chip coater, a roll coater, a dip coater and a doctor blade.

The thickness of the photosensitive layer of the electrophotographic photoreceptor is in a range from 5 μm to 100 μm, preferably 8 μm to 50 μm. When the thickness of the photosensitive layer of the electrophotographic photoreceptor is 5 μm or more, a decrease in the initial potential can be prevented. When the thickness of the photosensitive layer of the electrophotographic photoreceptor is 100 μm or less, degradation of the electrophotographic characteristics can be prevented. A ratio of the charge generating material for use in manufacturing the electrophotographic photoreceptor to the binder resin is 1:99 to 30:70 by mass, more preferably 3:97 to 15:85 by mass. On the other hand, a ratio of the charge transporting material to the binder resin is 10:90 to 80:20 by mass, more preferably 30:70 to 70:30 by mass.

Since the electrophotographic photoreceptor thus obtained uses the PC copolymer of this exemplary embodiment, a coating liquid is not whitened or gelled in manufacturing the photosensitive layer. In addition, since the PC copolymer of this exemplary embodiment is contained as the binder resin in the photosensitive layer, the electrophotographic photoreceptor has excellent durability (abrasion resistance) and electrical characteristics (electrification characteristics). Thus, the electrophotographic photoreceptor is a photoreceptor that maintains its excellent electrophotographic characteristics for a long time. Accordingly, the electrophotographic photoreceptor is suitably applicable to various electrophotographic fields such as copier (black and white copier, multi-color copier, full-color copier; analog copier, digital copier), printer (laser printer, LED printer, liquid-crystal shutter printer), facsimile, platemaker and equipment capable of functioning as a plurality of them.

Additionally, since the PC copolymer (copolymerized polycarbonate resin) of this exemplary embodiment is also excellent in surface physical properties and the like, when the PC copolymer is used in the electrophotographic photoreceptor, it is possible to provide the electrophotographic photoreceptor excellent in cleaning characteristics. When the cleaning characteristics are at a high level, it is possible to prevent the toner adhered to the surface of the photoreceptor from passing through a cleaning blade. Additionally, filming hardly occurs on the photoreceptor.

The cleaning characteristics can be confirmed by observing the toner adhered to the surface of the photoreceptor with use of an optical microscope.

The component of the PC copolymer of this exemplary embodiment related to the cleaning characteristics of the electrophotographic photoreceptor is exemplified by PPE (polyphenylene ether) skeleton. Since the PPE skeleton is contained in the PC copolymer, favorable cleaning characteristics are exhibited.

The electrophotographic photoreceptor of this exemplary embodiment is electrified in use by corona discharge (corotron, scorotron), contact electrification (charge roll, charge brush) or the like. Examples of the charge roll include a charge roll by DC electrification and a charge roll by AC/DC superimposed electrification in which the AC voltage is superimposed. For exposure, a halogen lamp, a fluorescent lamp, laser (semiconductor, He—Ne), LED or a photoreceptor internal exposure system may be used. For image development, dry developing such as cascade developing, two-component magnetic brush developing, one-component insulating toner developing and one-component conductive toner developing, and wet developing may be used. For transfer, electrostatic transfer (e.g., corona transfer, roller transfer and belt transfer), pressure transfer and adhesive transfer may be used, for example. For fixing, heat roller fixing, radiant flash fixing, open fixing, pressure fixing and the like may be used, for example. For cleaning and neutralizing, brush cleaner, magnetic brush cleaner, electrostatic brush cleaner, magnetic roller cleaner, blade cleaner may be used, for example. Incidentally, a cleaner-less system may be used. Examples of resin for toner include styrene-base resin, styrene-acrylic base copolymer resin, polyester, epoxy resin and cyclic hydrocarbon polymer. The toner may be spherical or amorphous. The toner controlled to have a certain shape (such as spheroidal shape and potato shape) can be also used. The toner may be pulverized toner, suspension-polymerized toner, emulsion-polymerized toner, chemically-pelletized toner, or ester-elongation toner.

Structure of Electronic Device

An electronic device of this exemplary embodiment includes the electrophotographic photoreceptor of this exemplary embodiment (e.g., a photosensitive drum using the electrophotographic photoreceptor of this exemplary embodiment). Examples of such an electronic device include a copier and a printer such as a laser printer.

Since the electronic device of this exemplary embodiment includes the electrophotographic photoreceptor excellent in the abrasion resistance of this exemplary embodiment, the exchange frequency of the photosensitive drum is decreased, so that the electronic device is significantly advantageous in terms of the cost.

Modification of Exemplary Embodiment

It should be noted that the present invention is not limited to the above-described embodiment but includes modifications and improvements as long as an object of the invention can be achieved.

For instance, as the repeating unit represented by the formula (2), the polycarbonate copolymer may have a repeating unit D represented by a formula (18) below and a repeating unit E represented by a formula (20) below.

Formula 32

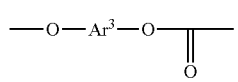

(18)

In the formula (18), $Ar^3$ is a group represented by a formula (19) below.

Formula 33

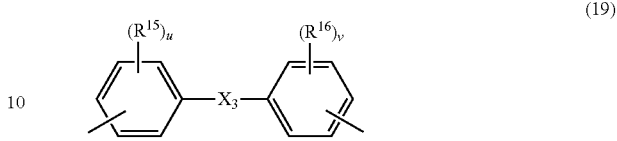

(19)

In the formula (19), $R^{15}$ and $R^{16}$ each independently represent a hydrogen atom, an alkyl group having 1 to 3 carbon atoms, a fluoroalkyl group having 1 to 3 carbon atoms or an alkoxy group having 1 to 3 carbon atoms.

$X_3$ represents —$CR^{17}R^{18}$—, a substituted or unsubstituted cycloalkylidene group having 5 to 10 carbon atoms or a substituted or unsubstituted arylene group having 6 to 13 carbon atoms.

$R^{17}$ and $R^{18}$ each independently represent a hydrogen atom, an alkyl group having 1 to 3 carbon atoms, a perfluoroalkyl group having 1 to 3 carbon atoms or a substituted or unsubstituted aryl group having 6 to 12 carbon atoms.

u and v are each independently an integer of 1 to 4. When an aromatic ring is substituted by two or more of $R^{15}$ (i.e., u≥2), the two or more of $R^{15}$ are the same or different from each other. When an aromatic ring is substituted by two or more of $R^{16}$ (i.e., v≥2), the two or more of $R^{16}$ are the same or different from each other.

Formula 34

(20)

In the formula (20), $Ar^4$ is a group represented by a formula (21) below. It should be noted that $Ar^4$ has a skeleton different from that of $Ar^3$.

Formula 35

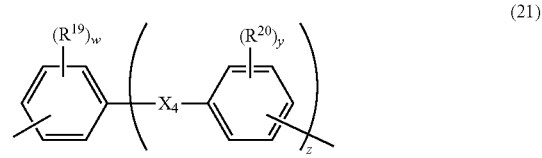

(21)

In the formula (21), $R^{19}$ and $R^{20}$ each independently represent a hydrogen atom, an alkyl group having 1 to 3 carbon atoms, a fluoroalkyl group having 1 to 3 carbon atoms or an alkoxy group having 1 to 3 carbon atoms.

$X_4$ represents a single bond or —O—.

w and z are each independently an integer of 1 to 4. When an aromatic ring is substituted by two or more of $R^{19}$ (i.e., w≥2), the two or more of $R^{19}$ are the same or different from each other. When an aromatic ring is substituted by two or more of $R^{20}$ (i.e., y≥2), the two or more of $R^{20}$ are the same or different from each other.

z represents 0 or 1.

In this case, when the mole number of the repeating unit A is denoted by $M_A$, the mole number of the repeating unit D is denoted by $M_D$, the mole number of the repeating unit E is denoted by $M_E$, and the mole percentage of the total mole numbers of the repeating units A, D and E ($M_A+M_D+M_E$) is 100 mol %, a mole percentage of the repeating unit A: $\{M_A/(M_A+M_D+M_E)\}\times 100$ is preferably in a range from 1 mol % to 7 mol %.

Further, the mole percentage of the repeating unit D: $\{M_D/(M_A+M_D+M_E)\}\times 100$ is preferably in a range from 15 mol % to 89 mol %, and the mole percentage of the repeating unit E: $\{M_E/(M_A+M_D+M_E)\}\times 100$ is preferably in a range from 10 mol % to 80 mol %.

Further, in this case, the repeating unit A in the PC copolymer is preferably in a range from 3 wt % to 60 wt %, more preferably in a range from 4 wt % to 40 wt %, further preferably in a range from 5 wt % to 30 wt %, still further preferably in a range from 5 wt % to 20 wt %.

When the repeating unit A is 60 wt % or less, an effect of the repeating unit A and an effect of the repeating unit D and the repeating unit E can be obtained in a balanced manner. Accordingly, in addition to the electrical strength, appropriate level of solubility can be secured, and when the PC copolymer is dissolved in an organic solvent, the resultant polymer solution is not whitened. When the repeating unit A is 3 wt % or more, the abrasion resistance of the repeating unit A and the effect of the electrical strength can be secured sufficiently, and the durability becomes sufficient in the PC copolymer.

As long as an object of the invention is not hampered, in the PC copolymer obtained as described above, the copolymer having the repeating unit A represented by the formula (1), the repeating unit D represented by the formula (18) and the repeating unit E represented by the formula (20) may contain a polycarbonate unit having a structure unit other than those of the repeating unit A, the repeating unit D and the repeating unit E, a unit having a polyester structure and a unit having a polyether structure.

EXAMPLES

Next, the invention will be described in detail with reference to Examples and Comparatives. However, the invention is not limited to the examples but may include various modifications and applications as long as such modifications and applications do not depart from a technical idea of the invention.

Manufacturing Example: Preparation of Oligomer

Manufacturing Example 1: Synthesis of BisZ Oligomer (Bischloroformate)

56.6 kg (224 mol) of 1,1-bis(4-hydroxyphenyl)cyclohexane (bisphenol Z) was suspended in 1080 L of methylene chloride, to which 66.0 kg (667 mol) of phosgene was added for dissolution. To the resultant solution, a solution prepared by dissolving 44.0 kg (435 mol) of triethylamine in 120 L of methylene chloride was dropped at 2.2 to 17.8 degrees C. for 2 hours and 50 minutes. After stirring at 17.9 to 19.6 degrees C. for 30 minutes, 900 L of methylene chloride was distilled away at 14 to 20 degrees C. 210 L of deionized water, 1.2 kg of concentrated hydrochloric acid and 450 g of hydrosulphite were added to the residual solution for cleaning. Subsequently, cleaning with 210 L of deionized water was repeated five times. A methylene chloride solution of a bisphenol Z oligomer having a chloroformate group at its molecular terminal was obtained.

The obtained solution had a chloroformate concentration of 1.14 mol/L, a solid concentration of 0.22 kg/L and an average number of monomers of 1.02. The raw material obtained in Manufacturing Example 1 is referred to as "Z-CF" hereinafter.

The average number of monomers ($n_{11}$) was calculated using the following mathematical formula.

$$\text{The average number of monomers } (n_{11}) = 1+(\text{Mav}-M1)/M2 \quad \text{(Mathematical Formula 1)}$$

(In the mathematical formula 1, May represents (2×1000/(CF value)), M2 represents (M1-98.92), and M1 represents a molecular weight of the bischloroformate compound when $n_{11}=1$ in the formula (100). The CF value (N/kg) represents (CF value/concentration). The CF value (N) represents the number of chlorine atoms in the bischloroformate compound represented by the formula (100) contained in 1 L of the reaction solution. The concentration (kg/L) represents an amount of the solid content obtained by concentrating the 1 L of the reaction solution. Herein, 98.92 is a total atom weight of two chlorine atoms, one oxygen atom and one carbon atom which are desorbed at polycondensation of the bischloroformate compounds.

Manufacturing Example 2: Synthesis of Bisphenol B Oligomer (Bischloroformate)

210 g (0.867 mol) of 2,2-bis(4-hydroxyphenyl)butane (bisphenol B), 1,058 mL of methylene chloride and 183 g (1.85 mol) of phosgene were mixed into a solution. To the mixed solution, a solution prepared by diluting 200.8 g (1.98 mol) of triethylamine in 460 mL of methylene chloride was dropped at 14 to 18.5 degrees C. for two hours and fifty minutes. After stirring the obtained reactant mixture at 18.5 to 19 degrees C. for one hour, 600 mL of methylene chloride was distilled away at 10 to 22 degrees C. 15.0 mL of concentrated hydrochloric acid, 150 mL of deionized water and 0.100 g of hydrosulphite were added to the reactant mixture. Subsequently, water cleaning was repeated until an aqueous layer became neutral, and a methylene chloride solution of a bisphenol B oligomer having a chloroformate group at its molecular terminal was obtained.

The obtained solution had a chloroformate concentration of 1.16 mol/L, a solid concentration of 0.24 kg/L and an average number of monomers of 1.08. The raw material obtained in Manufacturing Example 2 is referred to as "B-CF" hereinafter.

Manufacturing Example 3: Synthesis of Bisphenol C Oligomer (Bischloroformate)

152 g (0.595 mol) of 2,2-bis(3-methyl-4-hydroxyphenyl) propane (bisphenol C), 1,020 mL of methylene chloride and 187 g (1.89 mol) of phosgene were mixed into a solution. To the mixed solution, a solution prepared by diluting 199.4 g (1.97 mol) of triethylamine in 460 mL of methylene chloride was dropped at 13 to 16 degrees C. for three hours and six minutes. The obtained reactant mixture was stirred at 14 to 16 degrees C. for one hour and 38 minutes. 5.0 m of concentrated hydrochloric acid and 200 mL of deionized water were added to the reactant mixture for cleaning. Subsequently, water cleaning was repeated until an aqueous layer became neutral, and a methylene chloride solution of a bisphenol C oligomer having a chloroformate group at its molecular terminal was obtained.

The obtained solution had a chloroformate concentration of 1.04 mol/L, a solid concentration of 0.23 kg/L and an average number of monomers of 1.05. The raw material obtained in Manufacturing Example 3 is referred to as "C-CF" hereinafter.

Manufacturing Example 4: Synthesis of Bisphenol CZ Oligomer (Bischloroformate)

243 g (0.821 mol) of 1,1-bis(3-methyl-4-hydroxyphenyl)cyclohexane (bisphenol CZ), 1,058 mL of methylene chloride and 187 g (1.89 mol) of phosgene were mixed into a solution. To the mixed solution, a solution prepared by diluting 199.4 g (1.97 mol) of triethylamine in 460 mL of methylene chloride was dropped at 13 to 16 degrees C. for three hours and six minutes. The obtained reactant mixture was stirred at 14 to 16 degrees C. for one hour and 38 minutes. 5.0 m of concentrated hydrochloric acid and 200 mL of deionized water were added to the reactant mixture for cleaning. Subsequently, water cleaning was repeated until an aqueous layer became neutral, and a methylene chloride solution of a bisphenol CZ oligomer having a chloroformate group at its molecular terminal was obtained.

The obtained solution had a chloroformate concentration of 1.10 mol/L, a solid concentration of 0.24 kg/L and an average number of monomers of 1.01. The raw material obtained in Manufacturing Example 4 is referred to as "CZ-CF" hereinafter.

Manufacturing Example 5: Synthesis of DHPE Oligomer (Bischloroformate)

45.2 kg (224 mol) of 4,4'-dihydroxydiphenyl ether (DHPE) was suspended in 1080 L of methylene chloride, to which 66.0 kg (667 mol) of phosgene was added for dissolution. To the obtained solution, a solution prepared by dissolving 44.0 kg (435 mol) of triethylamine in 120 L of methylene chloride was dropped at 2.2 to 17.8 degrees C. for 2 hours and 50 minutes. After stirring the obtained reactant mixture at 17.9 to 19.6 degrees C. for 30 minutes, 900 L of methylene chloride was distilled away at 14 to 20 degrees C. 210 L of deionized water, 1.2 kg of concentrated hydrochloric acid and 450 g of hydrosulphite were added to the residual solution for cleaning. Subsequently, cleaning with 210 L of deionized water was repeated five times. A methylene chloride solution of a DHPE oligomer having a chloroformate group at its molecular terminal was obtained.

The obtained solution had a chloroformate concentration of 1.14 mol/L, a solid concentration of 0.19 kg/L and an average number of monomers of 1.03. The raw material obtained in Manufacturing Example 5 is referred to as "DHPE-CF" hereinafter.

Example 1

Manufacturing of PC Copolymer

Z-CF (160 mL) as a raw material obtained in Manufacturing Example 1 and methylene chloride (324 mL) were poured into a reactor provided with a mechanical stirrer, stirring vane and baffle plate. To the reactor, polyphenylene ether represented by the formula (12) (2.28 g) and p-tert-butylphenol (hereinafter referred to as PTBP) (0.235 g) as a terminal terminator were added and stirred for sufficient mixing. A 4,4'-biphenol solution was prepared by a 4,4'-biphenol solution preparation method including: preparing 160 mL of 1.5 N aqueous sodium hydroxide (containing 10.3 g of sodium hydroxide); cooling the solution to the room temperature or less; adding 0.25 g of hydrosulphite as an antioxidant and 15.1 g of 4,4'-biphenol to the solution; and completely dissolving 4,4'-biphenol. After the inner temperature of the reactor was cooled down to 15 degrees C., all amount of the 4,4'-biphenol solution prepared as described above was added to the above solution. 1.5 mL of a triethylamine aqueous solution (7 vol %) was added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-1) with the following structure.

Identification of PC Copolymer

Then, the PC copolymer (PC-1) thus obtained was dissolved in methylene chloride to prepare a solution having a concentration of 0.5 g/dL. When reduced viscosity [$\eta_{sp}/C$] thereof at 20 degrees C. was measured, the result was 1.23 dL/g. A structure and a composition of the obtained PC copolymer (PC-1) were analyzed by $^1$H-NMR spectrum method and $^{13}$C-NMR spectrum method. The obtained PC copolymer (PC-1) was identified as a PC copolymer having a repeating unit and a composition as follows.

Incidentally, for the reduced viscosity measurement, an automatic viscosity tester VMR-042 manufactured by RIGO CO., LTD. was used. The measurement was performed with an Ubbelohde modified viscometer (type: RM) designed for the automatic viscosity tester.

Formula 36

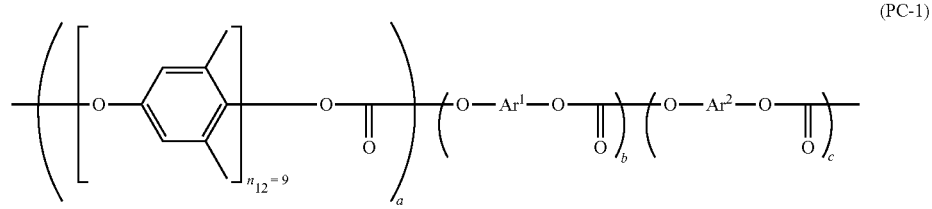

(PC-1)

Formula 37

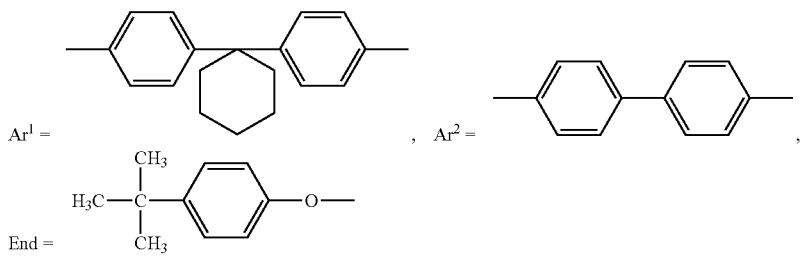

a=1.3
b=56.6
c=42.2

The repeating unit A in the PC copolymer (PC-1) was 5.4 wt %.

A structure of the PC copolymer in the formula (PC-1) was identified according to the following procedure. Firstly, a $^1$H-NMR spectrum was used to conduct an attribution analysis. Then, molar copolymerization ratios a, b and c of the respective repeating units were calculated based on an integral intensity.

Manufacturing of Coating Liquid and Electrophotographic Photoreceptor

A film of polyethylene terephthalate (PET) resin on which aluminum metal was deposited was used as a conductive substrate. A charge generating layer and a charge transporting layer were sequentially laminated on the surface of the conductive substrate to form a laminate sensitive layer, thereby providing an electrophotographic photoreceptor.

0.5 g of oxotitanium phthalocyanine was used as a charge generating material while 0.5 g of a butyral resin was used as a binder resin. The charge generating material and the binder resin were added into 19 g of methylene chloride (solvent) and dispersed with a ball mill. Then, the dispersion was applied onto the surface of the conductive-substrate film using a bar coater and dried, thereby providing a charge generating layer having a film thickness of approximately 0.5 μm.

Next, for use as a charge transporting material, 0.5 g of a compound (CTM-1) represented by the following formula (23) and 0.5 g of the polycarbonate copolymer (PC-1) obtained in the above example were dispersed in 10 mL of tetrahydrofuran to prepare a coating liquid. The coating liquid was applied onto the charge generating layer with an applicator and dried, thereby providing a charge transporting layer having a film thickness of approximately 20 μm.

Formula 38

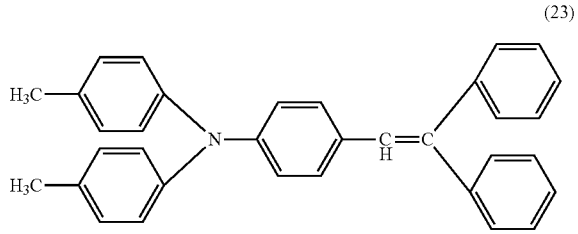

(23)

Evaluation of PC Copolymer and Electrophotographic Photoreceptor

Solubility of the PC copolymer was evaluated by visually checking whitening degree of the prepared coating liquid when the coating liquid was prepared. A case where the PC copolymer was dissolved to show no whitening was marked as "dissolved", a case where the PC copolymer was partially undissolved was marked as "undissolved", and a case where the PC copolymer was whitened was marked as "whitened."

Abrasion resistance of each of the PC copolymer and the electrophotographic photoreceptor was evaluated as follows (Preparation 1, Preparation 2 and Evaluation 3-1 described below). Additionally, plasma resistance as an index of the electrical strength of each of the PC copolymer and the electrophotographic photoreceptor was evaluated as follows (Preparation 1, Preparation 2 and Evaluation 3-2 described below).

Preparation 1: Preparation of Evaluation Sample of Copolymer

The PC copolymer (PC-1) (2 g) was dissolved in methylene chloride (12 mL) and the obtained solution was cast into film on a commercially available PET film using an applicator. This film was heated under reduced pressure and a solvent was removed to obtain a film sample having a thickness of about 30 μm.

Preparation 2: Preparation of Evaluation Sample of Photoreceptor

The PC copolymer (PC-1) (1 g) and the above CTM-1 (0.67 g) were dissolved in methylene chloride (10 mL) and the obtained solution was cast into film on a commercially available PET film using an applicator. This film was heated under reduced pressure and a solvent was removed to obtain a film sample having a thickness of about 30 μm.

Evaluation

Evaluation 3-1: Evaluation of Abrasion Resistance

Abrasion resistance of cast surfaces of the films prepared at each of Preparation 1 and Preparation 2 was evaluated using a Taber Abrasion Tester (manufactured by TOYO SEIKI SEISAKU-SHO, LTD.). Testing conditions: an abrasion wheel (model number: CS-10) to which a load of 500 g was applied is brought into contact with the film surface, and was rotated 1,000 times in Preparation 1 and 500 times in Preparation 2. Then, the mass reduction was measured.

Evaluation 3-2: Evaluation of Plasma Resistance

After surfaces of the cast samples prepared in Preparation 1 and Preparation 2 were treated using a corona surface treater AGI-0205 (manufactured by KASUGA ELECTRIC WORKS. LTD), a contact angle with water was measured. A difference in a contact angle between before and after electrical discharge was obtained as a change amount Δ and defined as an evaluation index on plasma resistance. The test was conducted under conditions of an electrical discharge amount being 58 W·min/m$^2$.

Evaluation 3-3: Evaluation of Electrification Characteristics of Electrophotographic Photoreceptor Next, electrophotographic characteristics of the electrophotographic photoreceptor prepared as described above were measured using an electrostatic charge tester EPA- 8100 (manufactured by Kawaguchi Electric Works Co., Ltd.). Specifically, corona discharge of −6 kV was conducted in the static mode. Then, the initial surface potential ($V_0$), residual potential (initial residual potential (VR)) after five seconds of light irradiation (10 Lux), and half-life exposure amount ($E_{1/2}$) were measured. Further, a commercially available printer (FS-600, manufactured by Kyocera Corporation) was modified, which enabled to measure the surface potential of the photoreceptor. Then, the photoreceptor was mounted on a drum and evaluated in terms of electrification characteristics (repeating residual potential (VR)) before and after 24-hour-consecutive operation under conditions of high temperature and high humidity (35 degrees C., 85%) not through a toner and a paper.

Evaluation 3-4: Evaluation of Cleaning Characteristics of Electrophotographic Photoreceptor The used drum was taken out of the commercially available printer FS-600, and the photosensitive layer was removed using a solvent. A coating liquid was prepared by dissolving and dispersing Y-type titanyl phthalocyanine pigment as a charge generating material (CGM) and polyvinyl butyral as binder resin in THF under the condition that CGM:resin=3:2 so that the solid content concentration became 4 wt % with a ball mill using zirconia beads. The resultant coating liquid is applied to the resultant aluminum tube stock by dipping.

After the resultant drum was dried under a reduced pressure at 70 degrees C. for 30 minutes, a coating liquid as the charge transporting layer (solution obtained by dissolving 60 g of the PC copolymer (PC-1) and 40 g of a stilbene-based compound (23) as the charge transport material (CTM) in 500 g of the THF) was applied to the drum by dipping. The resultant drum was dried under a reduced pressure at 110 degrees C. for two hours. Thus, a laminated electrophotographic photoreceptor was obtained. The resultant drum was set to the FS600 again.

After printing 2,000 sheets at a room temperature (25 degrees C.), the degree of adhesion of the toner to the surface of the photoreceptor before and after the operation was observed with use of an optical microscope. Then, the degree of adhesion of the toner to the surface of the photoreceptor was evaluated based on the following criteria.

Evaluation Criteria

A: Amount of the toner adhered to the surface of the photoreceptor is extremely small.

B: Amount of the toner adhered to the surface of the photoreceptor is small.

C: Amount of the toner adhered to the surface of the photoreceptor is slightly large.

D: Amount of the toner adhered to the surface of the photoreceptor is extremely large (corresponding to defect).

Evaluation results are shown in Table 1. Also in Examples 2 to 7 and Comparative 1 described below, instead of the PC copolymer (PC-1), PC copolymers obtained in the respective Examples were used to manufacture evaluation samples of the copolymers and photoreceptors, and the evaluation samples were evaluated in the same manner as Evaluation 3-1 to Evaluation 3-3. The results are shown in Table 1. Further, in Comparative 1, instead of the PC copolymer (PC-1), a PC copolymer (PC-8) was used to manufacture an evaluation sample and the evaluation sample was evaluated in the same manner as Evaluation 3-4.

Example 2

A PC copolymer (PC-2) having the following structure was obtained in the same operation as Example 1 except that an amount of polyphenylene ether represented by the formula (12) used in Example 1 was changed to 7.04 g in Example 2.

The PC copolymer (PC-2) was identified in NMR as a PC copolymer having 1.17 dL/g of reduced viscosity [$\eta_{SP}/C$] and a structure with the following repeating unit and composition.

Formula 39

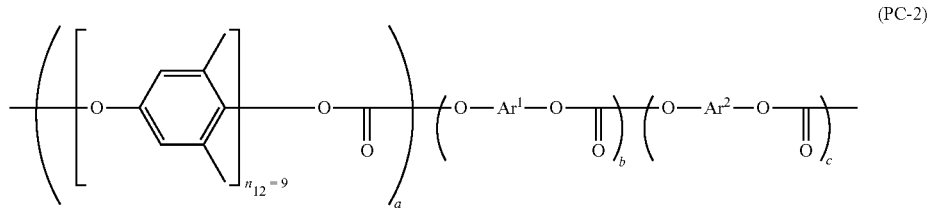

Formula 40

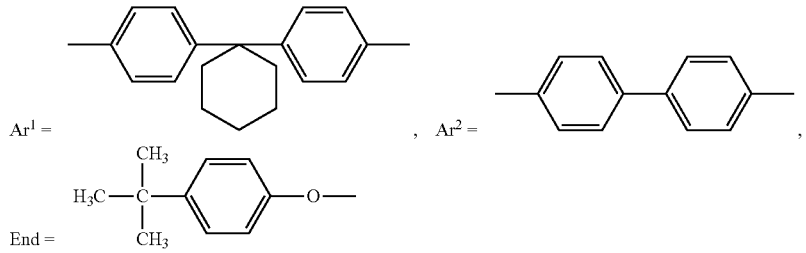

a=4.0
b=55.6
c=40.4

The repeating unit A in the PC copolymer (PC-2) was 15.3 wt %.

Example 3

CZ-CF (152 mL) as a raw material obtained in Manufacturing Example 4 and methylene chloride (340 mL) were poured into a reactor provided with a mechanical stirrer, stirring vane and baffle plate. To the reactor, polyphenylene ether represented by the formula (12) (2.28 g) and PTBP (0.235 g) as a terminal terminator were added and stirred for sufficient mixing. A 4,4'-biphenol solution was prepared by a 4,4'-biphenol solution preparation method including: preparing 160 mL of 1.5 N aqueous sodium hydroxide (10.3 g of sodium hydroxide); cooling the solution to the room temperature or less; adding 0.25 g of hydrosulphite as an antioxidant and 15.1 g of 4,4'-biphenol; and completely dissolving the mixed solution. After the inner temperature of the reactor was cooled down to 15 degrees C., all amount of the 4,4'-biphenol solution prepared as described above was added to the above solution. 1.5 mL of a triethylamine aqueous solution (7 vol %) was added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to obtain a PC copolymer (PC-3) with the following structure.

The PC copolymer (PC-3) was identified as a PC copolymer having 1.15 dL/g of reduced viscosity [$\eta_{SP}$/C] and a structure with the following repeating unit and composition in NMR.

Further, the repeating unit A in the PC copolymer (PC-3) was 5.5 wt %.

Example 4

C-CF (160 mL) as a raw material obtained in Manufacturing Example 3 and methylene chloride (324 mL) were poured into a reactor provided with a mechanical stirrer, stirring vane and baffle plate. To the reactor, polyphenylene ether represented by the formula (12) (2.28 g) and PTBP (0.245 g) as a terminal terminator were added and stirred for sufficient mixing. A 4,4'-biphenol solution was prepared by a 4,4'-biphenol solution preparation method including: preparing 160 mL of 1.5 N aqueous sodium hydroxide (10.3 g of sodium hydroxide); cooling the solution to the room temperature or less; adding 0.25 g of hydrosulphite as an antioxidant and 15.1 g of 4,4'-biphenol; and completely dissolving the mixed solution. After the inner temperature of the reactor was cooled down to 15 degrees C., all amount of the 4,4'-biphenol solution prepared as described above was added to the above solution. 1.5 mL of a triethylamine aqueous solution (7 vol %) was added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to obtain a PC copolymer (PC-4) with the following structure.

Formula 41

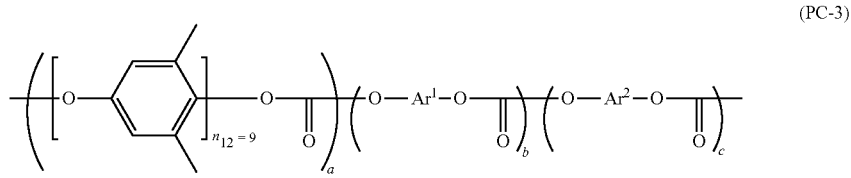

(PC-3)

Formula 42

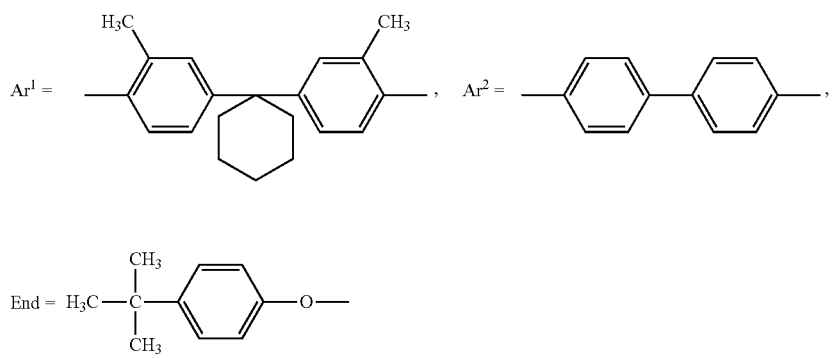

a=1.4 b=57.6 c=41.0

The PC copolymer (PC-4) was identified as a PC copolymer having 1.18 dL/g of reduced viscosity [$\eta_{SP}$/C] and a structure with the following repeating unit and composition in NMR.

Formula 43

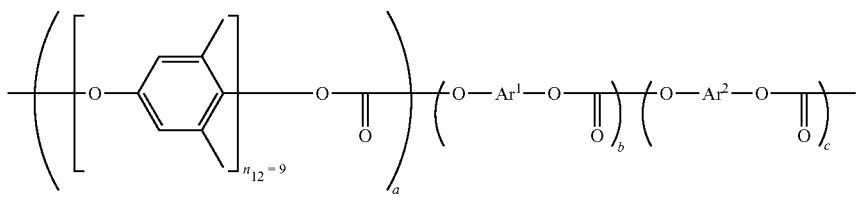
(PC-4)

Formula 44

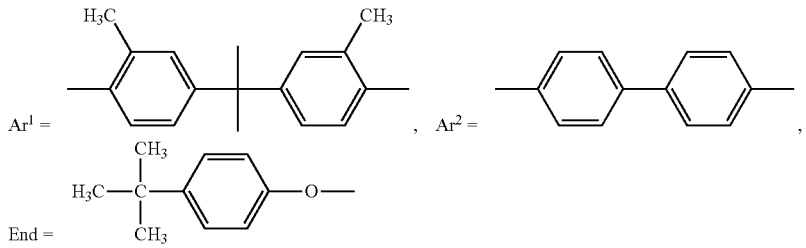

a=4.2
b=55.5
c=40.3

Further, the repeating unit A in the PC copolymer (PC-4) was 16.3 wt %.

Example 5

B-CF (144 mL) as a raw material obtained in Manufacturing Example 2 and methylene chloride (324 mL) were poured into a reactor provided with a mechanical stirrer, stirring vane and baffle plate. To the reactor, polyphenylene ether represented by the formula (12) (4.76 g) and PTBP (0.238 g) as a terminal terminator were added and stirred for sufficient mixing. A bis(4-hydroxyphenyl)ether solution was prepared by preparing 160 mL of 1.5 N aqueous sodium hydroxide (10.3 g of sodium hydroxide); cooling the solution to the room temperature or less; adding 0.25 g of hydrosulphite as an antioxidant and 16.0 g of bis(4-hydroxyphenyl)ether to the solution; and completely dissolving the hydrosulphite. After the inner temperature of the reactor was cooled down to 15 degrees C., all amount of the bis(4-hydroxyphenyl)ether solution prepared as described above was added to the above solution. 1.5 mL of a triethylamine aqueous solution (7 vol %) was added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to obtain a PC copolymer (PC-5) with the following structure.

The PC copolymer (PC-5) was identified as a PC copolymer having 1.15 dL/g of reduced viscosity [$\eta_{SP}/C$] and a structure with the following repeating unit and composition in NMR.

Formula 45

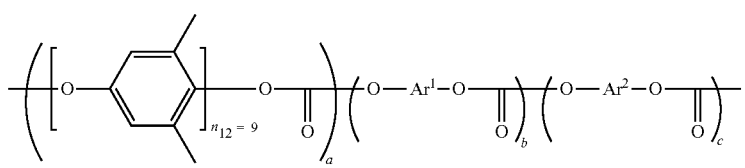
(PC-5)

Formula 46

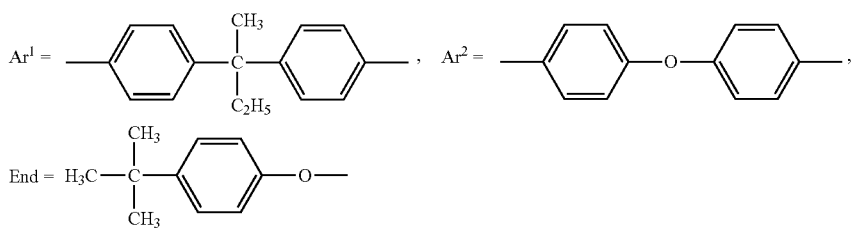

a=4.3
b=55.6
c=40.1

Further, the repeating unit A in the PC copolymer (PC-5) was 16.7 wt %.

Example 6

A PC copolymer (PC-6) having the following structure was obtained in the same operation as Example 1 except that an amount of polyphenylene ether represented by the formula (12) was changed to 22.20 g and an amount of 4,4'-biphenol was changed to 11.70 g in Example 6.

The PC copolymer (PC-6) was identified as a PC copolymer having 1.16 dL/g of reduced viscosity [$\eta_{SP}$/C] and a structure with the following repeating unit and composition in NMR.

Formula 47

(PC-6)

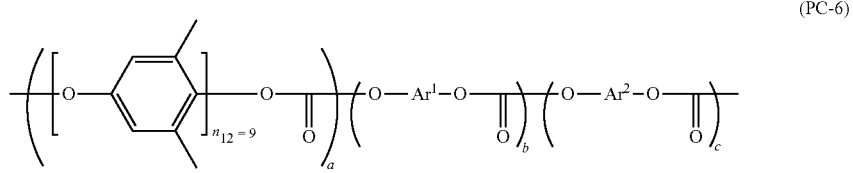

Formula 48

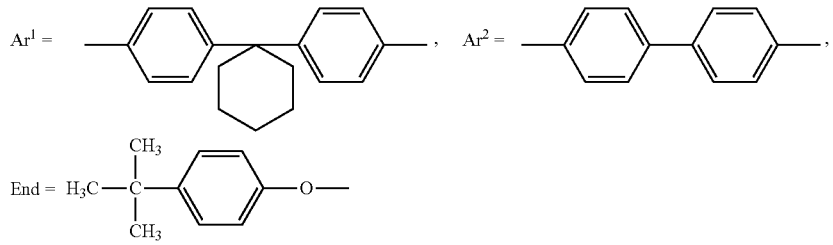

a=10.2
b=54.4
c=35.4

Further, the repeating unit A in the PC copolymer (PC-6) was 32.8 wt %.

Example 7

B-CF (59.6 mL) of Manufacturing Example 2, DHPE-CF (143.7 mL) of Manufacturing Example 5 and methylene chloride (400 mL) were poured into a reactor provided with a mechanical stirrer, stirring vane and baffle plate. To the reactor, polyphenylene ether represented by the formula (12) (4.76 g) and PTBP (0.189 g) as a terminal terminator were added and stirred for sufficient mixing. A 4,4'-dihydroxydiphenyl ether solution was prepared by preparing 200 mL of 2.0N potassium hydroxide solution (26.6 g of potassium hydroxide); cooling the potassium hydroxide solution to the room temperature or less; adding 0.1 g of hydrosulphite as an antioxidant and 24.25 g of 4,4'-dihydroxydiphenyl ether to the solution; and completely dissolving the mixture. After the inner temperature of the reactor was cooled down to 15 degrees C., all amount of the 4,4'-dihydroxydiphenyl ether solution prepared as described above was added to the above solution. 2.0 mL of a triethylamine aqueous solution (7 vol %) was added with stirring and kept on stirring for one hour.

The obtained reactant mixture was diluted with 0.3 L of methylene chloride and cleaned. A lower layer was separated from the reactant mixture. Then, the reactant mixture was cleaned with 0.2 L of water one time, with 0.2 L of 0.03N hydrochloric acid one time, and with 0.2 L of water three times in this order. The obtained methylene chloride solution was dropped into methanol with stirring. The obtained redeposit was filtered and dried to obtain a PC copolymer (PC-7) with the following structure.

The PC copolymer (PC-7) was identified in NMR as a PC copolymer having 1.21 dL/g of reduced viscosity [$\eta_{SP}$/C] and a structure with the following repeating unit and composition.

Formula 49

(PC-7)

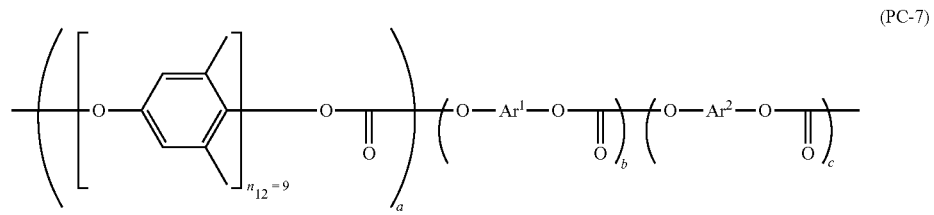

Formula 50

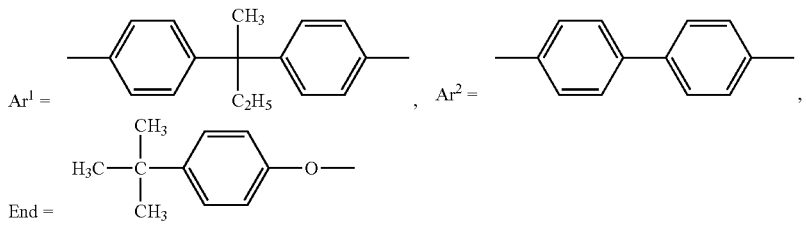

a=4.3
b=27.6
c=68.1

Further, the repeating unit A in the PC copolymer (PC-7) was 17.4 wt %.

Comparative 1

Z-CF (160 mL) as a raw material obtained in Manufacturing Example 1 and methylene chloride (324 mL) were poured into a reactor provided with a mechanical stirrer, stirring vane and baffle plate. To this solution, PTBP (0.235 g) as a terminal terminator was added and stirred for sufficient mixing. A 4,4'-biphenol solution was prepared by a 4,4'-biphenol solution preparation method including: preparing 162 mL of 2.0N potassium hydroxide solution (10.3 g of potassium hydroxide); cooling the solution to the room temperature or less; adding 0.25 g of hydrosulphite as an antioxidant and 15.80 g of 4,4'-biphenol; and completely dissolving the mixed solution. After the inner temperature of the reactor was cooled down to 15 degrees C., all amount of the 4,4'-biphenol solution prepared as described above was added to the above solution. 2.0 mL of a triethylamine aqueous solution (7 vol %) was added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to obtain a PC copolymer (PC-8) with the following structure.

The PC copolymer (PC-8) was identified in NMR as a PC copolymer having 1.17 dL/g of reduced viscosity [$\eta_{SP}$/C] and a structure with the following repeating unit and composition.

Formula 51

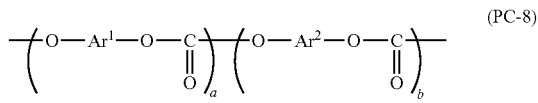
(PC-8)

Formula 52

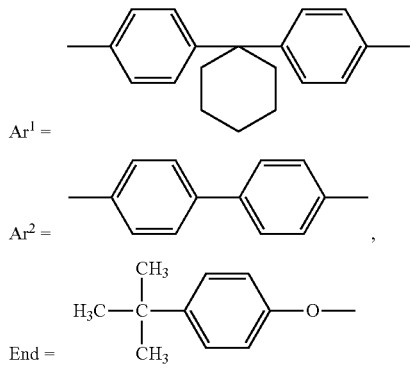

a=59.9
b=40.1

TABLE 1

|  | PC copolymer | | | | electrophotographic photoreceptor | | | |
| --- | --- | --- | --- | --- | --- | --- | --- | --- |
|  | reduced viscosity (dL/g) | abrasion resistance (mg) | contact-angle change amount Δ (before and after electrical discharge) | solubility | abrasion resistance (mg) | contact-angle change amount Δ (before and after electrical discharge) | initial residual potential (VR) | repeating residual potential (VR) |
| EX. 1 (PC-1) | 1.23 | 1.1 | 48.2 | dissolved | 5.2 | 49.7 | −10 | 10 |
| EX. 2 (PC-2) | 1.17 | 1.2 | 46.4 | dissolved | 5.6 | 47.8 | −10 | 10 |
| EX. 3 (PC-3) | 1.15 | 1.5 | 45.5 | dissolved | 5.7 | 47.0 | −10 | 10 |
| EX. 4 (PC-4) | 1.18 | 1.4 | 45.3 | dissolved | 5.3 | 46.8 | −10 | 10 |
| EX. 5 (PC-5) | 1.15 | 0.8 | 46.2 | dissolved | 4.3 | 47.7 | −10 | 10 |
| EX. 6 (PC-6) | 1.16 | 1.8 | 43.1 | dissolved | 6.0 | 44.5 | −10 | 10 |

TABLE 1-continued

| | PC copolymer | | | | electrophotographic photoreceptor | | | |
| --- | --- | --- | --- | --- | --- | --- | --- | --- |
| | reduced viscosity (dL/g) | abrasion resistance (mg) | contact-angle change amount Δ (before and after electrical discharge) | solubility | abrasion resistance (mg) | contact-angle change amount Δ (before and after electrical discharge) | initial residual potential (VR) | repeating residual potential (VR) |
| EX. 7 (PC-7) | 1.30 | 1.7 | 46.5 | dissolved | 5.9 | 48.0 | −10 | 10 |
| COMP. 1 (PC-8) | 1.17 | 2.3 | 61.0 | dissolved | 6.7 | 62.7 | −10 | 10 |

Evaluation Results

Table 1 shows evaluation results of Examples 1 to 7 and Comparative 1. In a comparison between Examples 1 to 7 and Comparative 1, it is confirmed that a favorable abrasion resistance is exhibited, a contact-angle change amount Δ caused by the electrical discharge is small, and electrification deterioration hardly occurs in the PC copolymers of Examples 1 to 7.

It is confirmed that the mole percentage of the repeating unit A is in a range from 1 mol % to 7 mol % and more favorable abrasion resistance is exhibited in the PC copolymers of Examples 1 to 5 and 7.

Particular is confirmed that the mole percentage of the repeating unit A in a range from 1 mol % to 7 mol %, the mole percentage of the repeating unit B in a range from 50 mol % to 69 mol %, and the mole percentage of the repeating unit C in a range from 30 mol % to 49 mol % are satisfied and extremely favorable abrasion resistance is exhibited in the PC copolymers of Examples 1 to 5.

Further, it is confirmed that favorable abrasion resistance is exhibited, a contact-angle change amount Δ caused by the electrical discharge is small, and electrification deterioration hardly occurs also in the electrophotographic photoreceptor of Examples 1 to 7.

Furthermore, in the evaluation of cleaning characteristics in the above Evaluation 3-4, the evaluation result of the electrophotographic photoreceptor using the PC copolymer of Example 1 is evaluated as "A" and favorable cleaning characteristics are exhibited.

On the other hand, it is confirmed that favorable abrasion resistance is exhibited, but a contact-angle change amount Δ caused by the electrical discharge is large, electrification deterioration easily occurs, and the electrical strength is insufficient in the copolymer of Comparative 1.

Additionally, it is confirmed that favorable abrasion resistance is exhibited, but a contact-angle change amount Δ caused by the electrical discharge is large and electrification deterioration easily occurs in the electrophotographic photoreceptor of Comparative 1. It is also confirmed that the evaluation result of the cleaning characteristics is "C" and the amount of the toner adhered to the surface of the photoreceptor is slightly large.

The invention claimed is:
1. A polycarbonate copolymer comprising:
a repeating unit A represented by a formula (1) below:

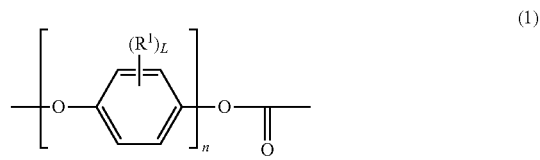

where, $R^1$ is a hydrogen atom or an alkyl group having 1 to 2 carbon atoms, an average repeating number n is in a range from 6 to 40 and L is an integer of 1 to 4, and when an aromatic ring is substituted by two or more of $R^1$ (L≥2), the two or more of $R^1$ are the same or different from each other;
a repeating unit B represented by a formula (4) below,

where, $Ar^1$ is a group represented by a formula (5) below,

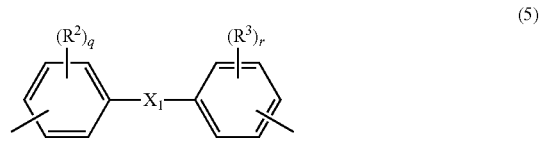

where, $R^2$ and $R^3$ each independently represent a hydrogen atom, an alkyl group having 1 to 3 carbon atoms, a fluoroalkyl group having 1 to 3 carbon atoms or an alkoxy group having 1 to 3 carbon atoms,
$X_1$ represents $—CR^4R^5—$, a substituted or unsubstituted cycloalkylidene group having 5 to 10 carbon atoms or a substituted or unsubstituted arylene group having 6 to 13 carbon atoms,
$R^4$ and $R^5$ each independently represent a hydrogen atom, an alkyl group having 1 to 3 carbon atoms, a perfluoroalkyl group having 1 to 3 carbon atoms, or a substituted or unsubstituted aryl group having 6 to 12 carbon atoms, with a proviso that not all of $R^4$ and $R^5$ are hydrogen atoms, and
q and r are each independently an integer of 1 to 4, the two or more of $R^2$ being the same or different from each other when an aromatic ring is substituted by two or more of $R^2$ (q≥2), and the two or more of $R^3$ being the same or different from each other when an aromatic ring is substituted by two or more of $R^3$ (r≥2); and a repeating unit C represented by a formula (6) below,

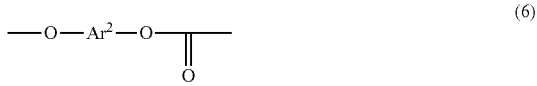         (6)

where, $Ar^2$ is a group represented by a formula (7) below, $Ar^2$ having a skeleton different from that of $Ar^1$,

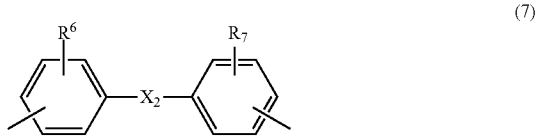         (7)

where $R^6$ and $R^7$ each independently represent a hydrogen atom, an alkyl group having 1 to 3 carbon atoms, a fluoroalkyl group having 1 to 3 carbon atoms or an alkoxy group having 1 to 3 carbon atoms, $X_2$ represents a single bond, —O—, —CO—, or —$CR^8R^9$—, and $R^8$ and $R^9$ each independently represent a hydrogen atom, an alkyl group having 1 to 3 carbon atoms, a perfluoroalkyl group having 1 to 3 carbon atoms, or a substituted or unsubstituted aryl group having 6 to 12 carbon atoms; and wherein the chain ends of the polycarbonate copolymer are terminated by a monovalent aromatic group derived from a phenol represented by formula (9) below or a monovalent fluorine-containing aliphatic group derived from a fluorine-containing alcohol represented by formula (10) below:

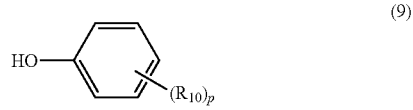         (9)

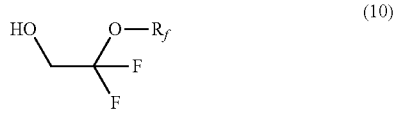         (10)

where, in the formula (9), $R_{10}$ is an alkyl group having 1 to 10 carbon atoms or a fluoroalkyl group having 1 to 10 carbon atoms, and p is an integer of 1 to 3, and in the formula (10), $R_f$ is a perfluoroalkyl group having 5 or more carbon atoms and 11 or more fluorine atoms, or a perfluoroalkyloxy group represented by a formula (11) below:

         (11)

where, in the formula (11), $R_{f2}$ is a linear or branched perfluoroalkyl group having 1 to 6 carbon atoms and m is an integer of 1 to 3.

2. The polycarbonate copolymer according to claim 1, wherein
the average repeating number n in the formula (1) is in a range from 6 to 15.

3. The polycarbonate copolymer according to claim 1, wherein
when a mole number of the repeating unit A is denoted by $M_A$, a mole number of the repeating unit B is denoted by $M_B$, a mole number of the repeating unit C is denoted by $M_C$, and a mole percentage of total mole numbers of the repeating units A, B and C ($M_A$+$M_B$+$M_C$) is 100 mol %, and
a mole percentage of the repeating unit A represented by $\{M_A/(M_A+M_B+M_C)\} \times 100$ is in a range from 1 mol % to 7 mol %.

4. The polycarbonate copolymer according to claim 3, wherein
a mole percentage of the repeating unit B represented by $\{M_B/(M_A+M_B+M_C)\} \times 100$ is in a range from 15 mol % to 89 mol %, and
a mole percentage of the repeating unit C represented by $\{M_C/(M_A+M_B+M_C)\} \times 100$ is in a range from 10 mol % to 80 mol %.

5. The polycarbonate copolymer according to claim 1, wherein
the repeating unit A accounts for 3 wt % to 60 wt % of a total weight of the polycarbonate copolymer.

6. The polycarbonate copolymer according to claim 1, wherein
when a mole number of the repeating unit A is denoted by $M_A$, a mole number of the repeating unit B is denoted by $M_B$, a mole number of the repeating unit C is denoted by $M_C$, and a mole percentage of total mole numbers of the repeating units A, B and C ($M_A$+$M_B$+$M_C$) is 100 mol %,
a mole percentage of the repeating unit A represented by $\{M_A/(M_A+M_B+M_C)\} \times 100$ is in a range from 1 mol % to 7 mol %,
a mole percentage of the repeating unit B represented by $\{M_B/(M_A+M_B+M_C)\} \times 100$ is in a range from 50 mol % to 69 mol %, and
a mole percentage of the repeating unit C represented by $\{M_C/(M_A+M_B+M_C)\} \times 100$ is in a range from 30 mol % to 49 mol %.

7. A polycarbonate copolymer comprising:
a repeating unit A represented by a formula (1) below:

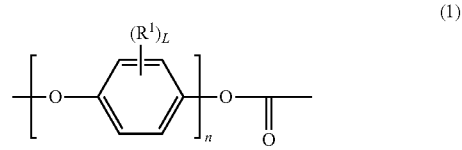         (1)

where, $R^1$ is a hydrogen atom or an alkyl group having 1 to 2 carbon atoms, an average repeating number n is in a range from 6 to 40 and L is an integer of 1 to 4, and when an aromatic ring is substituted by two or more of $R^1$ (L≥2), the two or more of $R^1$ are the same or different from each other;
a repeating unit D represented by a formula (18) below,

         (18)

where, Ar³ is a group represented by a formula (19) below,

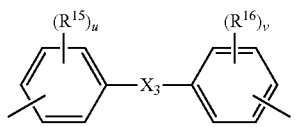

(19)

where, $R^{15}$ and $R^{16}$ each independently represent a hydrogen atom, an alkyl group having 1 to 3 carbon atoms, a fluoroalkyl group having 1 to 3 carbon atoms or an alkoxy group having 1 to 3 carbon atoms, $X_3$ represents —$CR^{17}R^{18}$-, a substituted or unsubstituted cycloalkylidene group having 5 to 10 carbon atoms or a substituted or unsubstituted arylene group having 6 to 13 carbon atoms, $R^{17}$ and $R^{18}$ each independently represent a hydrogen atom, an alkyl group having 1 to 3 carbon atoms, a perfluoroalkyl group having 1 to 3 carbon atoms, or a substituted or unsubstituted aryl group having 6 to 12 carbon atoms, with a proviso that not all of $R^{17}$ and $R^{18}$ are hydrogen atoms, and u and v are each independently an integer of 1 to 4, the two or more of $R^{15}$ being the same or different from each other when an aromatic ring is substituted by two or more of $R^{15}$ (u≥2), and the two or more of $R^{16}$ being the same or different from each other when an aromatic ring is substituted by two or more of $R^{16}$ (v≥2); and a repeating unit E represented by a formula (20) below,

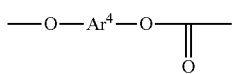

(20)

where, Ar⁴ is a group represented by a formula (21), Ar⁴ having a skeleton different from that of Ar³,

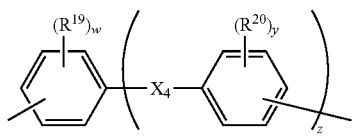

(21)

where, $R^{19}$ and $R^{20}$ each independently represent a hydrogen atom, an alkyl group having 1 to 3 carbon atoms, a fluoroalkyl group having 1 to 3 carbon atoms or an alkoxy group having 1 to 3 carbon atoms, $X_4$ represents a single bond or —O—, w and y are each independently an integer of 1 to 4, the two or more of $R^{19}$ being the same or different from each other when an aromatic ring is substituted by two or more of $R^{19}$ (w≥2), the two or more of $R^{20}$ being the same or different from each other when an aromatic ring is substituted by two or more of $R^{20}$ (y≥2), and z is 0 or 1; and wherein the chain ends of the polycarbonate copolymer are terminated by a monovalent aromatic group derived from a phenol represented by formula (9) below or a monovalent fluorine-containing aliphatic group derived from a fluorine-containing alcohol represented by formula (10) below:

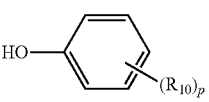

(9)

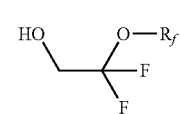

(10)

where, in the formula (9), $R_{10}$ is an alkyl group having 1 to 10 carbon atoms or a fluoroalkyl group having 1 to 10 carbon atoms, and p is an integer of 1 to 3, and in the formula (10), $R_f$ is a perfluoroalkyl group having 5 or more carbon atoms and 11 or more fluorine atoms, or a perfluoroalkyloxy group represented by a formula (11) below:

(11)

where, in the formula (11), $R_{f2}$ is a linear or branched perfluoroalkyl group having 1 to 6 carbon atoms and m is an integer of 1 to 3.

8. The polycarbonate copolymer according to claim 7, wherein when a mole number of the repeating unit A is denoted by $M_A$, a mole number of the repeating unit D is denoted by $M_D$, a mole number of the repeating unit E is denoted by $M_E$, and a mole percentage of total mole numbers of the repeating units A, D and E ($M_A+M_D+M_E$) is 100 mol %, a mole percentage of the repeating unit A represented by $\{M_A/(M_A+M_D+M_E)\}\times 100$ is in a range from 1 mol % to 7 mol %.

9. The polycarbonate copolymer according to claim 8, wherein a mole percentage of the repeating unit D represented by $\{M_D/(M_A+M_D+M_E)\}\times 100$ is in a range from 15 mol % to 89 mol %, and a mole percentage of the repeating unit E represented by $\{M_E/(M_A+M_D+M_E)\}\times 100$ is in a range from 10 mol % to 80 mol %.

10. The polycarbonate copolymer according to claim 1, wherein a reduced viscosity [ηsp/C] of the polycarbonate copolymer is in a range from 0.60 dL/g to 4.0 dL/g.

11. A coating liquid comprising:
the polycarbonate copolymer according to claim 1; and
an organic solvent.

12. An electrophotographic photoreceptor comprising the polycarbonate copolymer according to claim 1.

13. An electrophotographic photoreceptor comprising:
a conductive substrate;
a photosensitive layer formed on the substrate; and
wherein the photosensitive layer comprises the polycarbonate copolymer according to claim 1.

14. An electronic device comprising the electrophotographic photoreceptor according to claim 12.

15. A coating liquid comprising:
the polycarbonate copolymer according to claim 7; and
an organic solvent.

16. An electrophotographic photoreceptor comprising the polycarbonate copolymer according to claim 7.

17. An electrophotographic photoreceptor comprising:
a conductive substrate;
a photosensitive layer formed on the substrate; and
wherein the photosensitive layer comprises the polycarbonate copolymer according to claim 7.

18. An electronic device comprising the electrophotographic photoreceptor according to claim 16.

* * * * *

UNITED STATES PATENT AND TRADEMARK OFFICE
CERTIFICATE OF CORRECTION

PATENT NO. : 10,241,427 B2
APPLICATION NO. : 15/311320
DATED : March 26, 2019
INVENTOR(S) : Kengo Hirata Page 1 of 1

It is certified that error appears in the above-identified patent and that said Letters Patent is hereby corrected as shown below:

In the Claims

Column 60, Line 38, reads:

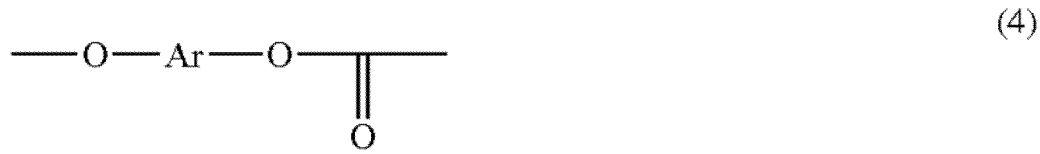

Should read:

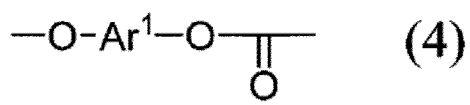

Signed and Sealed this
Twenty-seventh Day of August, 2019

Andrei Iancu
*Director of the United States Patent and Trademark Office*